United States Patent
Hosotani

(10) Patent No.: US 8,624,572 B2
(45) Date of Patent: Jan. 7, 2014

(54) SWITCHING CONTROL CIRCUIT AND SWITCHING POWER-SUPPLY APPARATUS

(75) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 309 days.

(21) Appl. No.: 13/006,527

(22) Filed: Jan. 14, 2011

(65) Prior Publication Data

US 2011/0175587 A1    Jul. 21, 2011

(30) Foreign Application Priority Data

Jan. 18, 2010  (JP) ................................ 2010-008274

(51) Int. Cl.
*G05F 1/40*  (2006.01)

(52) U.S. Cl.
USPC .......................................... 323/283; 323/272

(58) Field of Classification Search
USPC ........ 363/16–20, 21.01, 21.06, 21.12, 49, 71, 363/95, 98, 124, 127; 323/207, 222, 224, 323/225, 271–276, 282–288
See application file for complete search history.

(56) References Cited

U.S. PATENT DOCUMENTS

| | | | | |
|---|---|---|---|---|
| 4,484,295 A * | 11/1984 | Bedard et al. | ...................... | 708/8 |
| 4,823,070 A * | 4/1989 | Nelson | ......................... | 323/285 |
| 5,177,408 A | 1/1993 | Marques | | |
| 6,465,993 B1 * | 10/2002 | Clarkin et al. | ................. | 323/272 |
| RE39,065 E * | 4/2006 | Nelson | .......................... | 323/284 |
| 7,042,743 B2 * | 5/2006 | Pidutti et al. | .................... | 363/89 |
| 7,279,876 B2 * | 10/2007 | Adragna et al. | .............. | 323/284 |
| 7,446,517 B2 * | 11/2008 | Chen et al. | .................... | 323/284 |
| 7,535,736 B2 | 5/2009 | Nakamura et al. | | |
| 7,719,248 B1 * | 5/2010 | Melanson | ...................... | 323/283 |
| 8,018,694 B1 * | 9/2011 | Wu | ................................ | 361/18 |
| 2004/0263140 A1 | 12/2004 | Adragna et al. | | |
| 2006/0198167 A1 | 9/2006 | Nakamura | | |
| 2006/0209581 A1 | 9/2006 | Choi et al. | | |
| 2007/0007936 A1 | 1/2007 | Hiasa | | |
| 2007/0086223 A1 | 4/2007 | Uchida | | |
| 2007/0291516 A1 | 12/2007 | Nakamura et al. | | |
| 2008/0001589 A1 | 1/2008 | Shiroyama | | |
| 2008/0272744 A1 | 11/2008 | Melanson | | |
| 2009/0153116 A1 | 6/2009 | Hachiya | | |

FOREIGN PATENT DOCUMENTS

| | | |
|---|---|---|
| EP | 1 758 234 A2 | 2/2007 |
| JP | 2003-500986 A | 1/2003 |
| JP | 2003-527809 A | 9/2003 |

(Continued)

OTHER PUBLICATIONS

Official Communication issued in corresponding Japanese Patent Application No. 2010-008274, mailed on Feb. 21, 2012.

*Primary Examiner* — Rajnikant Patel
(74) *Attorney, Agent, or Firm* — Keating & Bennett, LLP

(57) ABSTRACT

A switching power-supply apparatus and a switching power supply circuit in which a feedback signal is input from a feedback circuit to a feedback terminal of a switching control IC includes a capacitor and a Zener diode connected between the feedback terminal and a ground terminal. The Zener diode is a selectively connected external circuit. A voltage of the feedback terminal during an overcurrent operation changes depending on whether or not the external circuit is present. A return/latch determination circuit detects the voltage of the feedback terminal to switch between an automatic return system and a latch system in an overcurrent operation state.

41 Claims, 22 Drawing Sheets

(56) References Cited

FOREIGN PATENT DOCUMENTS

| | | |
|---|---|---|
| JP | 2004-120901 A | 4/2004 |
| JP | 2004-194412 A | 7/2004 |
| JP | 2005-073311 A | 3/2005 |
| JP | 2006-246685 A | 9/2006 |
| JP | 2007-14081 A | 1/2007 |
| JP | 2007-73954 A | 3/2007 |
| JP | 2007-116789 A | 5/2007 |
| JP | 2008-005567 A | 1/2008 |
| JP | 2008-11636 A | 1/2008 |
| JP | 2008-533972 A | 8/2008 |
| JP | 2009-124826 A | 6/2009 |
| JP | 2009-148012 A | 7/2009 |
| WO | 00/70730 A1 | 11/2000 |
| WO | 00/72434 A1 | 11/2000 |
| WO | 2005/109617 * | 11/2005 |
| WO | 2005/109617 A1 | 11/2005 |
| WO | 2009/157937 A1 | 12/2009 |

* cited by examiner

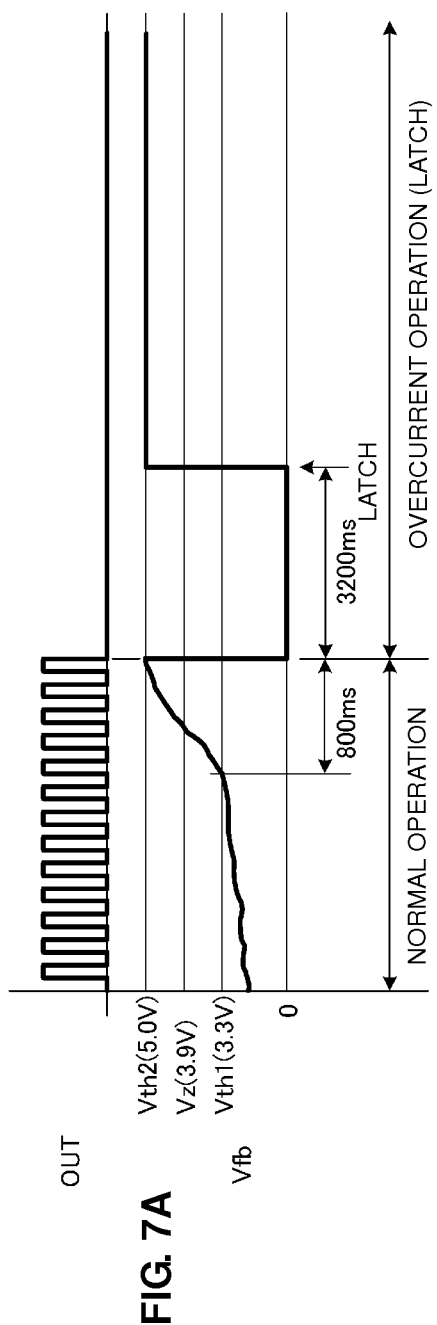
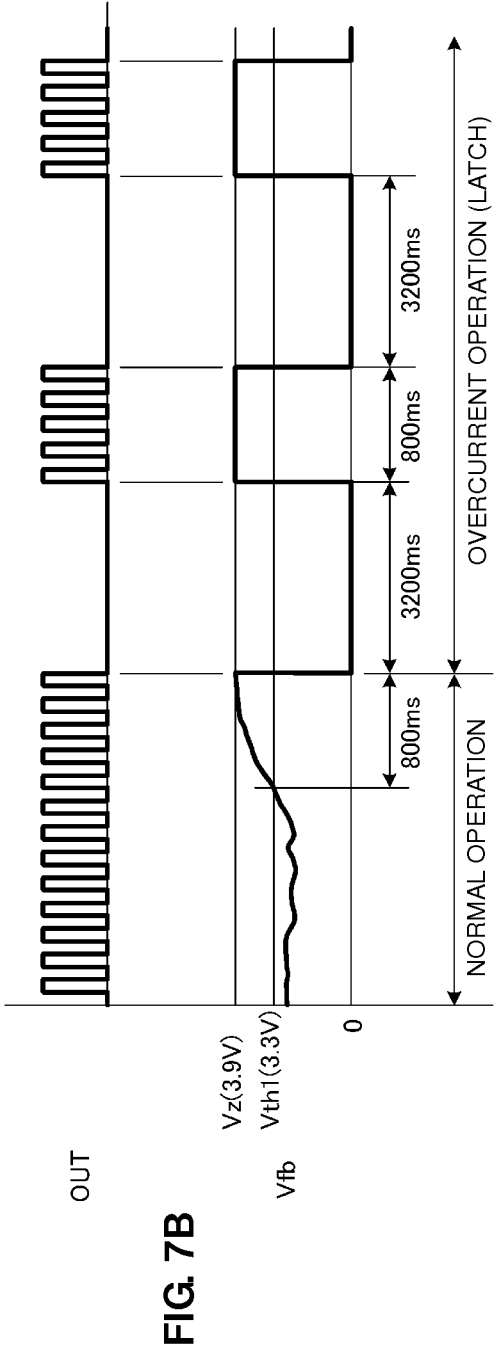
FIG. 7A
FIG. 7B

SWITCHING CONTROL CIRCUIT AND SWITCHING POWER-SUPPLY APPARATUS

BACKGROUND OF THE INVENTION

1. Field of the Invention

The present invention relates to a switching control circuit integrated into an IC (integrated circuit), and also relates to a switching power-supply apparatus including the switching control circuit.

2. Description of the Related Art

Typically, a switching control IC in a switching power-supply apparatus includes a circuit arranged to provide various functions for, for example, output control, startup operation, overcurrent protection operation, overvoltage protection operation, standby operation, and power-factor correction operation. The number of functions is increased to improve the functions of the switching control ICs.

In order to set the functions of a switching control IC so that they correspond to operation specifications of an application, multiple terminals arranged to interface with external circuits are required for the respective functions. Thus, when the number of functions increases, the number of terminals increases accordingly. An increase in the number of terminals results in an increased package size of the switching control IC, which leads to an increase in the unit price of the IC.

On the other hand, a switching control IC having a reduced number of terminals is required in order to meet demands for miniaturization of a switching control IC and reduction of the mounting dimension thereof. Sixteen pins are often provided as the terminals for typical switching control ICs and eight pins are often provided for small-sized switching control ICs. Four pins are also provided for further miniaturized switching control ICs.

When the number of terminals for a switching control IC is limited, the number of functions that can be provided are also limited. Thus, it is necessary to produce a wide range of variants of ICs in accordance with the functions and to selectively use the ICs depending on the specifications and the applications. In this case, there are problems in that the number of variants of the ICs increases, not only the manufacturing process but also the IC management becomes complicated, and consequently the unit price of the ICs increases.

It is inevitable that the size of the IC will increase as the required functionality increases. However, recently, even for small-sized switching control circuits, the number of required functions has been increasing. Under the current situation, mass production of a small number of variants is effective in order to reduce the unit price of semiconductors, such as ICs. In addition, a small-sized IC package that includes a smaller number of terminals can also reduce the unit price of the IC.

Japanese Unexamined Patent Application Publication No. 2007-73954 discloses a technology for a switching control IC directed at reducing the number of terminals.

FIG. 1 is a circuit diagram of a switching power-supply apparatus disclosed in Japanese Unexamined Patent Application Publication No. 2007-73954. In FIG. 1, a switching power-supply apparatus 101 includes a transformer 105 including a primary winding 127 and a secondary winding 129, a rectifying/smoothing circuit including a diode 117 and a capacitor 119, a feedback circuit including a Zener diode 121, a photocoupler 113, and a resistor 123, and an integrated circuit 103.

The integrated circuit 103 is connected to the primary winding 127. The integrated circuit 103 is a switching regulator including an internal switch coupled between a drain (D) terminal and a source (S) terminal of the integrated circuit 103.

During operation, the internal switch in the integrated circuit 103 adjusts energy transmission from an input 107 to an output 109 through the transformer 105. A feedback signal is input from the feedback circuit to the integrated circuit 103.

A multifunction capacitor 111 is connected to a bypass terminal BP of the integrated circuit 103. The multifunction capacitor 111 is arranged to provide a power-supply decoupling function for the integrated circuit 103 during normal operation. The internal circuit of the integrated circuit 103 receives power or bias current from the multifunction capacitor 111 to operate during normal operation while adjusting the output 109.

The multifunction capacitor 111 is arranged to select a parameter/mode of the integrated circuit 103 during an initialization period of the integrated circuit 103. During the initialization period, the parameter/mode of the integrated circuit 103 is selected.

In the switching power-supply apparatus disclosed in Japanese Unexamined Patent Application Publication No. 2007-73954, a terminal arranged to provide a necessary function is used to determine the setting of another function during an initialization period. Thus, the capacitance of the multifunctional capacitor is set so that the parameter/mode of the integrated circuit 103 is selected in accordance with a difference in the rate of an increase in the charging voltage during the initialization period.

With such a configuration in which the setting of the parameter/mode of the switching control IC is determined during the initialization period, the number selectable functions is relatively small. In addition, since only the capacitor is used to set the parameter/mode, the selection function is severely restricted.

SUMMARY OF THE INVENTION

To overcome the problems described above, preferred embodiments of the present invention provide a switching control circuit a number of terminals that is not increased, and a small-size and low-cost switching power-supply apparatus, by increasing a number of selectable functions, as compared to the known system in which the parameter/mode is set in accordance with a difference in the rate of increase in the charging voltage of the capacitor, and enabling an existing terminal to have an additional function (i.e., to have a hidden function).

A switching control circuit according to a preferred embodiment of the present invention includes a semiconductor integrated circuit preferably defining a power conversion circuit in a switching power-supply apparatus which is arranged to control a switching element, the semiconductor integrated circuit preferably including external terminals including a power-supply terminal to which a power-supply voltage is applied from outside of the semiconductor integrated circuit to inside of the semiconductor integrated circuit, an input terminal arranged to input a voltage signal from the outside to the inside, and an output terminal arranged to output a voltage signal from the inside to the outside, at least one of the external terminals defining a multifunctional external terminal. The switching control circuit preferably includes a first operation-state setter arranged to set a first operation parameter or first operation mode information of the power conversion circuit or first control of the switching element, based on a signal of the multifunctional external terminal, and a second operation-state setter arranged to detect, as a determination signal, a voltage induced in an external circuit that is connected to outside of the multifunctional external terminal and that includes at least one of a resistance element or a semiconductor element and arranged to set a second operation parameter or second operation mode information of the power conversion circuit in accordance with the determination signal.

The first operation parameter and the second operation parameter are preferably signals applied to control a predetermined operation and information or electrical power. The first operation mode information and the second operation mode information are information to set an operation mode.

The multifunctional external terminal may preferably be the power-supply terminal, for example. In accordance with the determination signal, the second operation-state setter may preferably perform the setting of the second operation parameter or second operation mode information of the power conversion circuit or second control of the switching element, for example.

One of the signals input to the multifunctional external terminal may preferably be an output-voltage detection signal (a feedback signal) input from the power conversion circuit through an operation of the switching control circuit, for example. In accordance with the output-voltage detection signal, the first operation-state setter may preferably be arranged to set an operation parameter for stabilization control of an output voltage and in accordance with the determination signal, the second operation-state setter may preferably be arranged to perform the setting of the second operation parameter or the second operation mode information or second control of the switching element, other than the stabilization of the output voltage, for example.

One of the signals input to the multifunctional external terminal may preferably be a current detection signal resulting from current flowing in the power conversion circuit through an operation of the switching control circuit, for example. In accordance with the current detection signal, the first operation-state setter may preferably be arranged to set an operation parameter or an operation mode during overcurrent control, and in accordance with the determination signal, the second operation-state setter may preferably be arranged to perform the setting of the second operation parameter or the second operation mode information of the power conversion circuit or second control of the switching element, other than the overcurrent control, for example.

One of the signals input to the multifunctional external terminal may preferably be a waveform signal of an input power-supply voltage, for example. In accordance with the waveform signal, the first operation-state setter may preferably be arranged to perform the first control of the switching element, and in accordance with the determination signal, the second operation-state setter may preferably be arranged to perform the setting of the second operation parameter or second operation mode information of the power conversion circuit or second control of the switching element, for example.

One of the signals input to the multifunctional external terminal may preferably be a frequency setting signal (the first operation parameter) that specifies a frequency of a voltage pulse, output from the output terminal, for operating the switching control circuit, for example. In accordance with the frequency setting signal, the first operation-state setter may preferably be arranged to specify a frequency of a voltage pulse output from the multifunctional external terminal, and in accordance with the determination signal, the second operation-state setter may preferably be arranged to perform the setting of the second operation parameter or the second operation mode information or second control of the switching element, other than an operation of specifying the frequency, for example.

One of the signals input to the multifunctional external terminal may preferably be a pulse-width setting signal (the first operation parameter) to specify a pulse width of a voltage pulse, output from the output terminal, to operate the switching control circuit, for example. In accordance with the pulse-width setting signal, the first operation-state setter may preferably be arranged to specify a pulse width of a voltage pulse output from the multifunctional external terminal, and in accordance with the determination signal, the second operation-state setter may preferably be arranged to perform the setting of the second operation parameter or the second operation mode information or second control of the switching element, other than an operation of specifying the pulse-width, for example.

One of the signals input to the multifunctional external terminal may preferably be a voltage pulse output control signal to determine starting or stopping of a voltage pulse output from the multifunctional external terminal in order to operate the switching control circuit, for example. In accordance with the voltage pulse output control signal, the first operation-state setter may preferably be arranged to determine starting or stopping of a voltage pulse output from the multifunctional external terminal, and in accordance with the determination signal, the second operation-state setter may preferably be arranged to perform the setting of the second operation parameter or the second operation mode information or second control of the switching element, other than the determination of starting or stopping of the voltage pulse, for example.

One of the signals input to the multifunctional external terminal may preferably be an overvoltage detection signal indicating whether or not a voltage output from the power conversion circuit is an overvoltage, for example. In accordance with the overvoltage detection signal, the first operation-state setter may preferably be arranged to perform an overvoltage protection operation, and in accordance with the determination signal, the second operation-state setter may preferably be arranged to perform the setting of the second operation parameter or the second operation mode information or second control of the switching element, other than the overvoltage protection operation, for example.

One of the signals input to the multifunctional external terminal may preferably be a compensation signal to compensate for a gain and a phase of a feedback signal voltage output from the power conversion circuit through an operation of the switching control circuit, for example. In accordance with the compensation signal, the first operation-state setter may preferably be arranged to compensate for the gain and the phase of the feedback signal voltage, and in accordance with the determination signal, the second operation-state setter may preferably be arranged to perform the setting of the second operation parameter or the second operation mode information or second control of the switching element, other than the compensation for the gain and the phase of the feedback signal voltage in accordance with the compensation signal, for example.

One of the signals input to the multifunctional external terminal may preferably be a polarity reversal timing signal indicating that a polarity of current flowing in or a voltage generated by an inductor or a transformer of the power conversion circuit changes through an operation of the switching control circuit, for example. The first operation-state setter may preferably be arranged to control the switching control circuit in accordance with the polarity reversal signal, and in accordance with the determination signal, the second operation-state setter may preferably be arranged to perform the setting of the second operation parameter or the second operation mode information or second control of the switching element, other than the controlling of the switching control circuit in accordance with the polarity reversal timing signal, for example.

A signal output from the multifunctional external terminal may preferably be a switching-element control signal to control a voltage of a control terminal of the switching element in order to operate the switching control circuit, for example. The first operation-state setter may preferably be arranged to output the switching-element control signal to the switching element, and in accordance with the determination signal, the second operation-state setter may preferably be arranged to perform the setting of the second operation parameter or the second operation mode information, other than the outputting of the switching-element control signal, for example.

A signal output from the multifunctional external terminal may preferably be a reference voltage signal generated in order to operate the switching control circuit, for example. The first operation-state setter may preferably be arranged to output the reference voltage signal, and in accordance with the determination signal, the second operation-state setter may preferably be arranged to perform the setting of the second operation parameter or the second operation mode information or second control of the switching element, other than the outputting of the reference voltage signal, for example.

A signal output from the multifunctional external terminal may preferably be an operation state signal indicating whether or not an operation state of the power conversion circuit is normal, for example. The first operation-state setter may preferably be arranged to output the operation state signal, and in accordance with the determination signal, the second operation-state setter may preferably be arranged to perform the setting of the second operation parameter or the second operation mode information or second control of the switching element, other than the outputting of the operation state signal, for example.

In accordance with a voltage waveform (such as a phase), the first operation-state setter may preferably be arranged to perform the setting of the first operation parameter or the first operation mode information or the first control of the switching element, and in accordance with a result of comparison between a waveform peak value and a reference voltage, the second operation-state setter preferably be arranged to perform the setting of the second operation parameter or the second operation mode information or second control of the switching element, for example.

In accordance with a result of comparison between a waveform peak value and a reference voltage, the first operation-state setter may preferably be arranged to perform the setting of the first operation parameter or the first operation mode information or the first control of the switching element, and in accordance with a result of comparison between an average voltage value of the determination signal and a reference voltage, the second operation-state setter preferably be arranged to perform the setting of the second operation parameter or the second operation mode information or second control of the switching element, for example.

In accordance with a result of comparison between a largest voltage value and a reference voltage, the first operation-state setter may preferably be arranged to perform the setting of the first operation parameter or the first operation mode information or the first control of the switching element, and in accordance with a result of comparison between a smallest voltage value of the determination signal and a reference voltage, the second operation-state setter may preferably be arranged to perform the setting of the second operation parameter or the second operation mode information or second control of the switching element, for example.

In accordance with a frequency band of the determination signal, the second operation-state setter may preferably be arranged to perform the setting of the second operation parameter or the second operation mode information or second control of the switching element, for example.

The switching control circuit may preferably further include a current supply circuit arranged to supply current to the multifunctional external terminal to which the external circuit is connected.

The semiconductor element may preferably be a Zener diode, a transistor, or an operational amplifier, for example.

The second operation-state setter may preferably be arranged to set the second operation parameter or the second operation mode information, in accordance with a voltage value of a voltage to be compared, the voltage value being obtained in a period (a time period) other than a period of a power conversion operation of the power conversion circuit, for example.

In accordance with the determination signal before an operation of the power conversion circuit is started, the second operation-state setter may preferably be arranged to set the second operation parameter or the second operation mode information or second control of the switching element, for example.

In accordance with a signal of the multifunctional external terminal in a startup time from the start of an operation of the power conversion circuit until a steady-state operation, the first operation-state setter may preferably be arranged to perform the setting of the first operation parameter or the first operation mode information or the first control (e.g., for an SS terminal) of the switching element, and in accordance with the determination signal of the steady-state operation of the power conversion circuit, the second operation-state setter may preferably be arranged to perform the setting of the second operation parameter or the second operation mode information or second control of the switching element, for example.

In accordance with the determination signal of an on-period or off-period of the switching element in a period that is not necessary for the operation of the power conversion circuit, the second operation-state setter may preferably be arranged to perform the setting of the second operation parameter or the second operation mode information or second control of the switching element, for example.

The second operation parameter may preferably be a switching frequency of the switching element, a limit value of a largest value or a smallest value of a switching frequency of the switching element, a threshold for determining an overload state based on an overcurrent detection signal resulting from current flowing in the power conversion circuit through an operation of the switching control circuit, a threshold for determining an overvoltage state based on an overvoltage detection signal indicating whether or not a voltage output from the power conversion circuit is an overvoltage, a start threshold for determining starting of the power conversion circuit or a stop threshold for determining stopping of the power conversion circuit, a limit value of an on time of the switching element, or a limit value of a duty ratio of a pulse for driving the switching element, for example.

The second operation mode information may preferably be information regarding a distinction of an output control system of the power conversion circuit, information regarding a distinction of an operation mode in an overload state, information regarding a distinction of an operation mode in an overvoltage state, or information regarding distinction of an operation mode in a light load state, for example.

As an example of the operation in the operation mode, the output control system may preferably be one of output-voltage constant control, output-current constant control, and output-power constant control.

As an example of the operation in the operation mode, the operation mode in the overload state may preferably be an automatic return mode in which an oscillation period and a stop period are repeated or a latch mode in which oscillation is stopped.

As an example of the operation in the operation mode, the operation mode in the overvoltage state may preferably be an automatic return mode in which an oscillation period and a stop period are repeated or a latch mode in which oscillation is stopped.

The operation mode in the light load state may preferably be an intermittent oscillation mode in which an oscillation period and a stop period are repeated or a frequency reduction mode in which a switching frequency of the switching element is reduced to perform an operation in a discontinuous current mode, for example.

According to various preferred embodiments of the present invention, a switching power-supply apparatus is provided in which the power conversion circuit includes a switching control circuit according to a preferred embodiment of the present invention.

According to various preferred embodiments of the present invention, it is possible to use an existing terminal to set another function without affecting the function of the normal operation of the existing terminal. Accordingly, it is possible to reduce the number of terminals of an IC, reduce the size of the IC, and reduce the cost. In addition, configuring the IC to have multiple functions enables it to be applied to power supplies with a wide range of specifications and for a wide variety of applications.

The above and other elements, features, steps, characteristics, and advantages of the present invention will become more apparent from the following detailed description of the preferred embodiments with reference to the attached drawings.

BRIEF DESCRIPTION OF THE DRAWINGS

FIGS. 7A and 7B are diagrams of waveforms at an output terminal and a feedback terminal of a switching control IC.

DETAILED DESCRIPTION OF THE PREFERRED EMBODIMENTS

Preferred embodiments of the present invention will be described below with reference to the drawings.

First Preferred Embodiment

Figure 1:
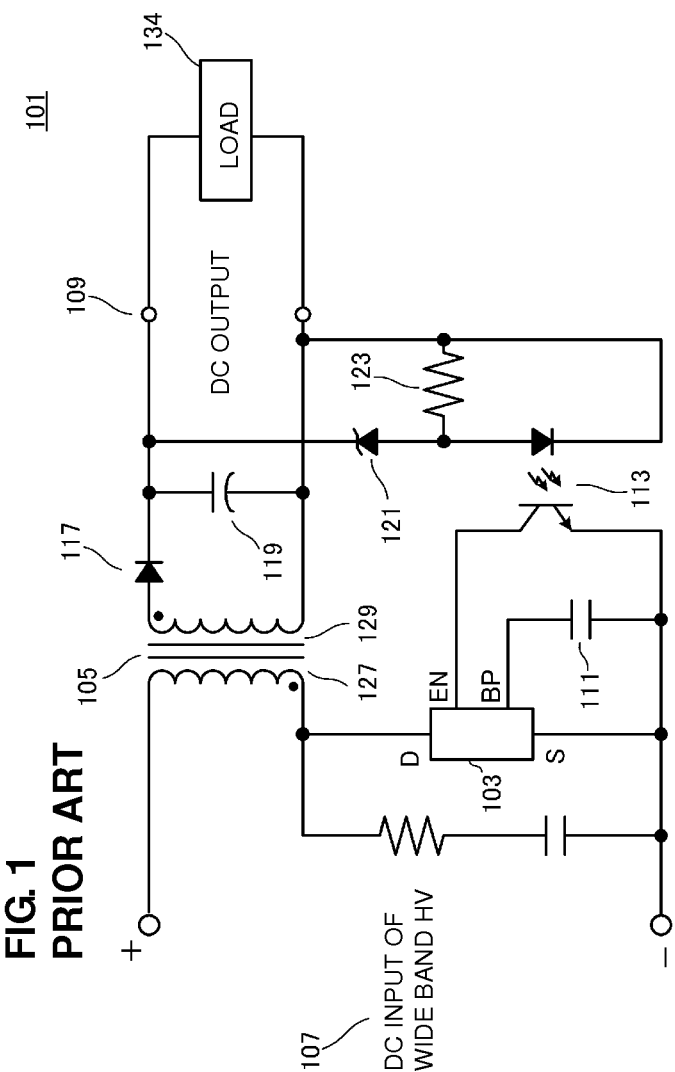
FIG. 1 is a circuit diagram of a known switching power-supply apparatus.
Figure 2:
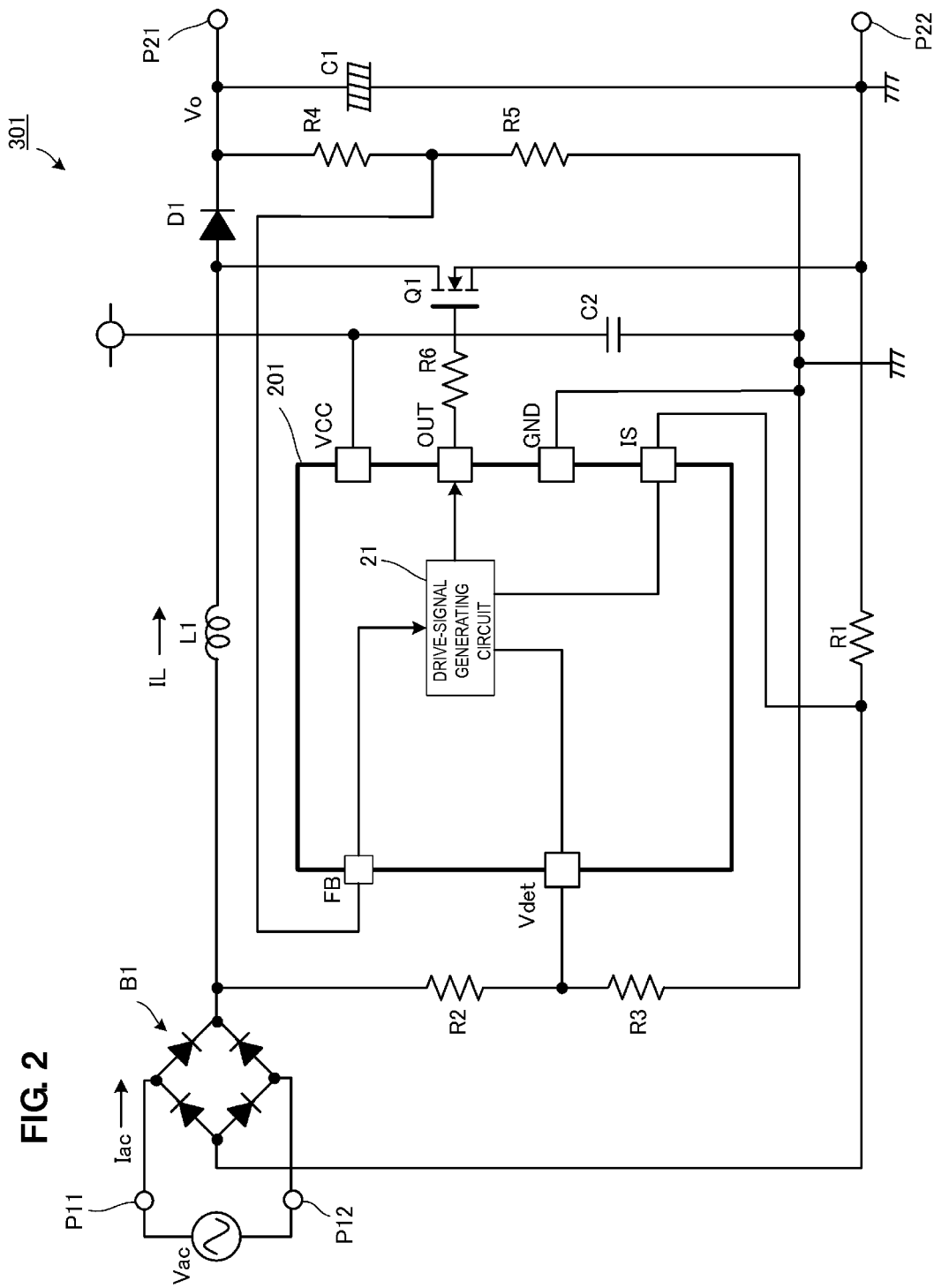
FIG. 2 is a circuit diagram of a PFC converter according to a first preferred embodiment of the present invention.

FIG. 2 is a circuit diagram of a PFC (power-factor corrected) converter 301 according to a first preferred embodiment of the present invention.

The PFC converter 301 is one example of a switching control device according to a preferred embodiment of the present invention and includes a switching control integrated circuit (IC) 201 corresponding to the switching control circuit of a preferred embodiment of the present invention.

The PFC converter 301 includes input terminals P11 and P12 and output terminals P21 and P22. An alternating-current (AC) input power supply Vac, which is commercial AC power supply, is preferably input to the input terminals P11 and P12 and a load circuit is connected to the output terminals P21 and P22.

Examples of the load circuit include a DC-DC converter or a circuit of electronic equipment that receives a power supply through a DC-DC converter.

An input stage of the PFC converter 301 includes a diode bridge B1, which functions as a rectifier circuit to rectify full waves of the AC voltage of the AC input power supply Vac. A series circuit including an inductor L1, a switching element Q1, and a current detection resistor R1 is preferably connected to output ends of the diode bridge B1. A rectifying/smoothing circuit including a diode D1 and a smoothing capacitor C1 is preferably connected in parallel with two opposite ends of the switching element Q1. The inductor L1, the switching element Q1, the diode D1, and the smoothing capacitor C1 define a step-up chopper circuit.

The switching control IC 201 preferably includes a power-supply terminal VCC, a ground terminal GND, an output terminal OUT of a switching control signal, an input-voltage detection terminal Vdet, a feedback terminal FB, and a current detection terminal IS.

A noise elimination and voltage stabilization capacitor C2 is preferably connected between the power-supply terminal VCC and the ground terminal GND of the switching control IC 201.

An input-voltage detection circuit including resistors R2 and R3 is preferably provided between two opposite output ends of the diode bridge B1. A voltage output from the input-voltage detection circuit is preferably input to the input-voltage detection terminal Vdet of the switching control IC 201. An output-voltage detection circuit including resistors R4 and R5 is preferably provided between the output terminals P21 and P22. A voltage output from the output-voltage detection circuit is preferably input to the feedback terminal FB of the switching control IC 201.

A resistor R6 is preferably connected between a gate of the switching element Q1 and the output terminal OUT of the switching control IC 201.

The switching control IC 201 includes a drive-signal generating circuit 21. Based on the signal input to the input-voltage detection terminal Vdet, the drive-signal generating circuit 21 detects an instantaneous voltage of the AC input power source. Based on the signal input to the feedback terminal FB, the drive-signal generating circuit 21 also detects an output voltage. In addition, the drive-signal generating circuit 21 turns on/off the switching element Q1 at a predetermined switching frequency.

Figure 3:
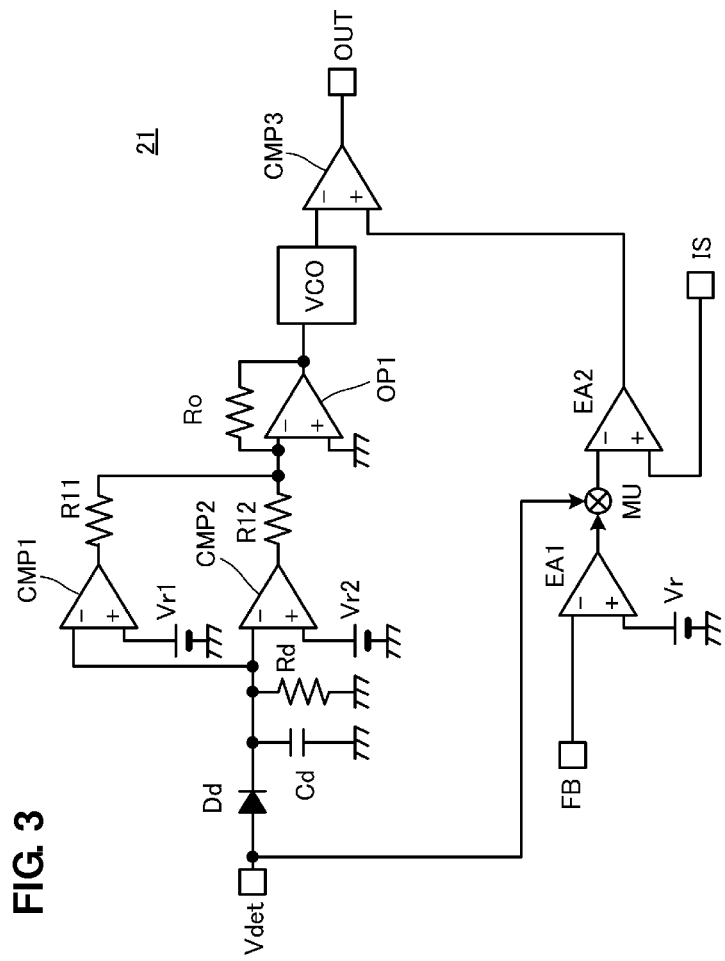
FIG. 3 is an example of a specific circuit diagram of a drive-signal generating circuit shown in FIG. 2.

FIG. 3 is an example of a specific circuit diagram of the drive-signal generating circuit 21 shown in FIG. 2. In FIG. 3, a capacitor Cd and a resistor Rd smooth a voltage of the input-voltage detection terminal Vdet. Comparators CMP1 and CMP2 compare a voltage of the capacitor Cd with corresponding reference voltages Vr1 and Vr2 and output a high-level or a low-level signal in accordance with the high-and-low relationships. An operational amplifier OP1 and resistors R11, R12, and Ro define a summing circuit. A voltage-controlled oscillator (VCO) preferably generates a substantially triangular wave signal, for example, having a frequency corresponding to the voltage output from the summing circuit.

An error amplifier EA1 preferably generates an error voltage signal indicating an error between a proportional value of a voltage output from the PFC converter and a reference voltage Vr. A multiplier MU multiplies the error voltage signal and a rectification voltage obtained from the diode bridge B1. The diode Dd prevents reverse flow from the capacitor Cd to the multiplier MU. An error amplifier EA2 preferably generates an error between the result of the multiplication performed by the multiplier MU and a current signal flowing in the diode bridge B1 and outputs the generated error to a PWM (pulse-width modulation) comparator CMP3.

The substantially triangular wave signal output from the VCO is input to a negative (−) terminal of the PWM comparator CMP3 and the signal output from the error amplifier EA2 is input to a positive (+) terminal of the PWM comparator CMP3. Thus, the PWM comparator CMP3 applies a duty pulse corresponding to the current flowing in the diode bridge B1 and the output voltage to the switching element Q1. The duty pulse is a pulse-width control signal that is sequentially compensated for at regular intervals in response to variations in the AC power-supply voltage and the DC load voltage. With this arrangement, the average value of current of the inductor L1 is controlled so as to have a form that is similar to the full-wave-rectified waveform of the input voltage, thereby causing the switching control device to operate as a PFC converter.

In the first preferred embodiment, the input-voltage detection terminal Vdet of the switching control IC 201 is preferably defined by a multifunctional external terminal according to a preferred embodiment of the present invention. Since a control voltage for the VCO changes in a stepwise manner according to the voltage of the input-voltage detection terminal Vdet, the frequency of the substantially triangular wave signal is switched according to the voltage of the input-voltage detection terminal Vdet.

Figure 4:
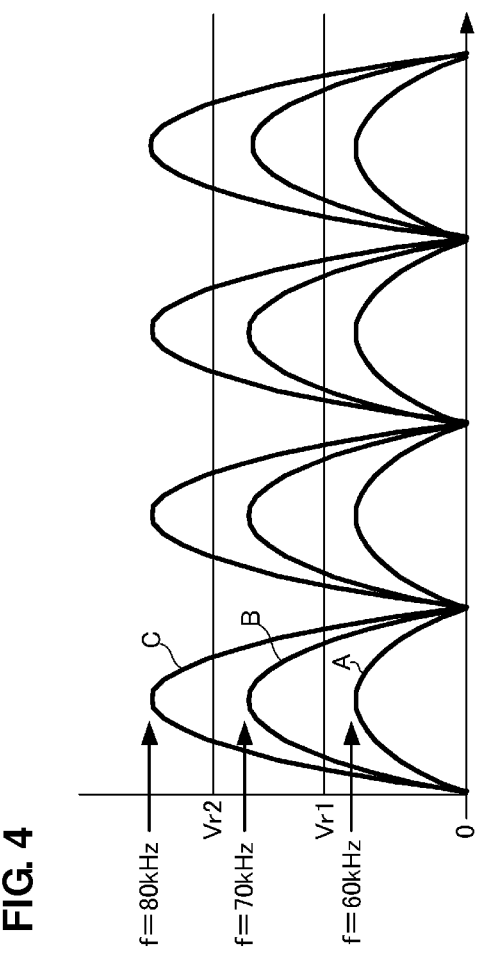
FIG. 4 is a graph showing a relationship between the waveform of a signal input to an input-voltage detection terminal and an oscillation frequency of a VCO.

FIG. 4 is a graph showing a relationship between the waveform of the signal input to the input-voltage detection terminal Vdet and an oscillation frequency of the VCO. When a charging voltage of the capacitor Cd does not exceed Vr1, the oscillation frequency of the VCO is preferably about 60 kHz, for example. When the charging voltage of the capacitor Cd exceeds Vr1 and does not exceed Vr2, the oscillation frequency of the VCO is preferably about 70 kHz, for example. When the charging voltage of the capacitor Cd exceeds Vr2, the oscillation voltage of the VCO is preferably about 80 kHz, for example.

In order to satisfy such a relationship, the reference voltages Vr1 and Vr2 for the comparators CMP1 and CMP2 shown in FIG. 3 are predetermined and the values of the resistors R11, R12, and Ro of the summing circuit are predetermined.

The voltage input to the input-voltage detection terminal Vdet changes according to the resistance division ratio of the input-voltage detection circuit that is connected to the input-voltage detection terminal Vdet and that includes the resistors R2 and R3. Thus, selection of the value of the resistor R2 or R3 connected to the input-voltage detection terminal Vdet makes it possible to select a switching frequency. That is, the input-voltage detection terminal Vdet preferably functions as both a terminal arranged to input an input voltage waveform to the PFC converter and a terminal arranged to set the switching frequency.

The configuration described above is also applicable to a switching control IC including a terminal Idet arranged to detect an inductor current. That is, the original function of the inductor-current detection terminal Idet is to input a voltage signal from a circuit to detect an inductor current and to control an ON time of the switching element in accordance with a comparison between the average value of the input voltage signal and a reference voltage (i.e., a value corresponding to an average inductor current). For example, the switching frequency may preferably be switched depending on whether or not the value of the voltage signal input to the inductor-current detection terminal Idet exceeds a predetermined threshold.

Instead of the switching of the switching frequency, a threshold at which the operation is in one of an overcurrent protection operation state, an overload protection operation state, and an overvoltage protection operation state in response to a peak value of the voltage input to the terminal may preferably be specified, for example. In addition, a threshold at which the operation is changed from a normal operation to the protection operation and a threshold at which the operation is changed from the protection operation to the normal operation may also preferably be specified, for example.

Second Preferred Embodiment

Figure 5:
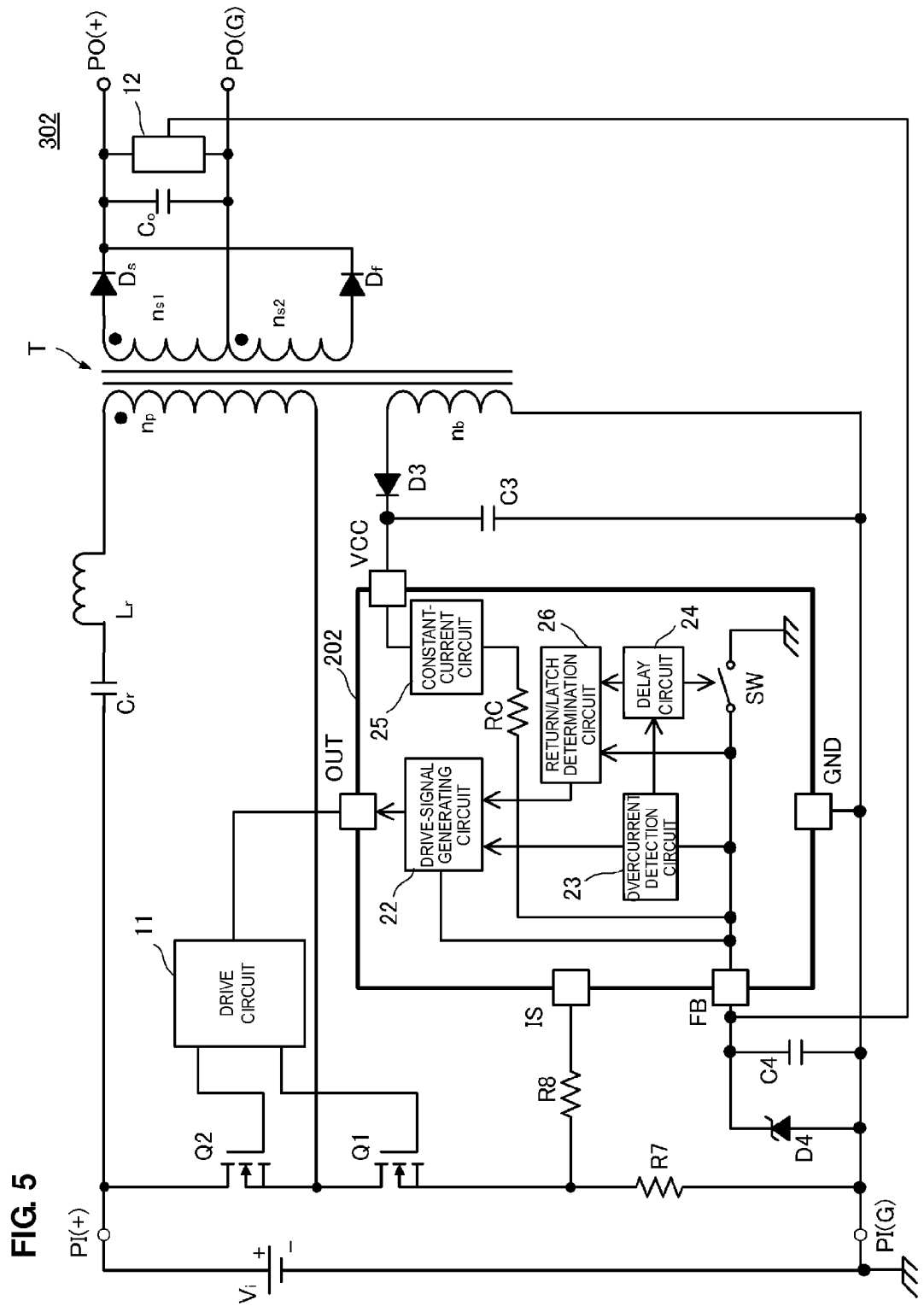
FIG. 5 is a circuit diagram of a DC-DC converter according to a second preferred embodiment of the present invention.

FIG. 5 is a circuit diagram of a DC-DC converter 302 according to a second preferred embodiment of the present invention.

The DC-DC converter 302 is one example of the switching control device according to a preferred embodiment of the present invention and includes a switching control IC 202 corresponding to the switching control circuit according to a preferred embodiment of the present invention.

A voltage of the DC input power supply Vi is input between an input terminal PI(+) and an input terminal PI(G) of the DC-DC converter 302. A load is connected between an output terminal PO(+) and an output terminal PO(G) of the DC-DC converter 302. A predetermined DC voltage is output to the load.

A first series circuit including a capacitor Cr, an inductor Lr, a primary winding np of a transformer T, a first switching element Q1, and a current-detection resistor R7 that are connected in series is preferably provided between the input terminal PI(+) and the input terminal PI(G). The first switching element Q1 preferably includes an FET (field-effect transistor). Preferably, a drain terminal of the first switching element Q1 is connected to the primary winding np of the transformer T and a source terminal of the first switching element Q1 is connected to the current-detection resistor R7.

A second series circuit including a second switching element Q2, the capacitor Cr, and the inductor Lr that are connected in series is preferably connected to two opposite ends of the primary winding np of the transformer T.

Secondary windings ns1 and ns2 of the transformer T are preferably provided with a first rectifying/smoothing circuit including diodes Ds and Df and a capacitor Co. The first rectifying/smoothing circuit preferably rectifies full waves of an AC voltage output from the secondary windings ns1 and ns2, smoothes the resulting voltages, and outputs the smoothed voltages to the output terminals PO(+) and the PO(G).

A rectifying/smoothing circuit including a diode D3 and a capacitor C3 is preferably connected to a drive winding nb of the transformer T. This rectifying/smoothing circuit preferably provides a DC voltage, which is supplied between a GND terminal and a VCC terminal of the switching control IC 202, as a power-supply voltage.

A substantially rectangular wave signal, for example, is preferably output to a drive circuit 11 from an OUT terminal of the switching control IC 202. The drive circuit 11 preferably performs control so that the first switching element Q1 and the second switching element Q2 are alternately turned on and off. A dead-time period is preferably provided so as to prevent the switching elements Q1 and Q2 from being simultaneously turned on.

The switching control IC 202 has a current detection terminal IS to which a resistor R8 is connected so that a dropped voltage of the current-detection resistor R7 is input to the current detection terminal IS.

A feedback circuit 12 is preferably provided between the output terminals PO(+) and PO(G) and the switching control IC 202. The feedback circuit 12 preferably functions as a circuit that generates a feedback signal by comparing a voltage division value of a voltage between the output terminals PO(+) and the PO(G) with a reference voltage and that inputs a feedback voltage to a feedback terminal FB of the switching control IC 202 in an insulated state.

A capacitor C4 and a Zener diode D4 are preferably connected between the feedback terminal FB and the ground terminal GND. The Zener diode D4 is a selectively connected external circuit.

Figure 6:
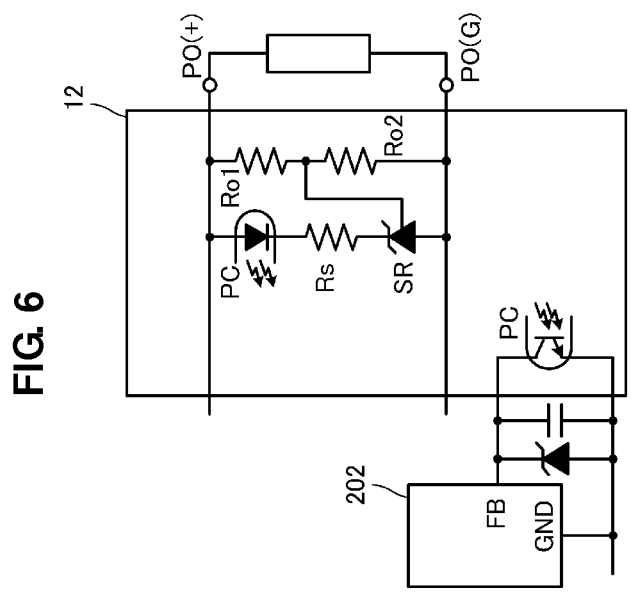
FIG. 6 is a circuit diagram of a feedback circuit.

FIG. 6 is a circuit diagram of the feedback circuit 12. A series circuit including a shunt regulator SR, a resistor Rs, and a light-emitting element including a photocoupler PC and a voltage dividing circuit including resistors Ro1 and Ro2 are preferably connected between the output terminal PO(+) and the output terminal PO(G). A light receiving element including a photocoupler PC is preferably connected between the feedback terminal FB and the ground terminal GND of the switching control IC 202. Inside the switching control IC 202, a constant-current circuit is preferably connected to the feedback terminal FB.

The feedback circuit 12 operates such that the voltage at the feedback terminal FB decreases as the voltage output to the output terminals PO(+) and PO(G) is increased to greater than a preset voltage.

FIGS. 7A and 7B are diagrams of waveforms at the output terminal OUT and the feedback terminal FB of the switching control IC. The internal configuration and the operation of the switching control IC 202 shown in FIG. 5 will be described with reference to FIGS. 5 to 7B.

A drive-signal generating circuit 22 turns on/off the first switching element Q1 and the second switching element Q2 via the drive circuit 11 at a predetermined switching frequency. Thus, the DC-DC converter 302 operates as a current resonant converter.

During normal operation, which is not an overcurrent operation, the voltage fed back from the feedback circuit 12 does not exceed a Zener voltage of the Zener diode D4. Thus, during the normal operation, the drive-signal generating circuit 22 detects an output voltage based on the signal input to the feedback terminal FB and controls the frequency of the substantially rectangular wave signal to be output to the output terminal OUT so that the detected output voltage becomes constant or substantially constant. As a result of the control, the output voltage of the DC-DC converter 302 is stabilized.

When the voltage of the feedback terminal FB exceeds about 3.3 V for more than about 800 ms, for example, an overcurrent detection circuit 23 determines that the operation is in an overcurrent operation state (overload state). After the period of about 800 ms, for example, passes, a delay circuit 24 turns on a switch SW in the switching control IC 202 to cause the feedback terminal FB to become about 0 V, for example. Consequently, the drive-signal generating circuit 22 stops the switching of the switching elements Q1 and Q2.

Thereafter, when about 3200 ms, for example, passes, the delay circuit 24 turns off the switch SW to release the voltage of the feedback terminal FB from the about 0 V clamp. A constant-current circuit 25 is preferably connected to the feedback terminal FB via a resistor Rc. Thus, if the Zener diode D4 is not connected to the feedback terminal FB, the external capacitor C4 increases to about 5.3 V, for example, which is the voltage at the power-supply voltage terminal VCC, and the voltage of the feedback terminal FB exceeds about 5 V, for example. On the other hand, for example, when the Zener diode D4 connected to the feedback terminal FB has a Zener voltage of about 3.9 V, the voltage at the feedback terminal FB does not exceed the Zener voltage of about 3.9 V.

A return/latch determination circuit 26 detects a voltage at the feedback terminal FB when about 50 μs, for example, passes after the switch SW is turned off. When the detected voltage is greater than about 5 V, for example, the return/latch determination circuit 26 stops the drive-signal generating circuit 22. That is, the return/latch determination circuit 26 latches the switching operation while stopping it. On the other hand, when the detected voltage is less than about 5 V, for example, the drive-signal generating circuit 22 operates and the operation automatically returns to the switching operation state.

As a result of the operation described above, when the Zener diode D4 is not connected to the feedback terminal FB, the operation enters a latch operation mode, and when the Zener diode D4 is connected to the feedback terminal FB, the operation enters an automatic return operation mode.

For example, the automatic return system and the latch system can be switched by detecting the voltage of the feedback terminal FB and performing setting so as to accomplish an operation as described below:

About 0.4 V to about 3.3 V: Range of Control Operation using Feedback Voltage

About 3.3 V or greater: Range of Overcurrent Protection Operation (Automatic Return (Hiccup) System)

About 5.0 V or greater: Range of Overcurrent Protection Operation (Latch System).

Thus, there is no need to provide a switching control IC based on two systems, i.e., the latch system and the automatic feedback system, as the overcurrent protection functions of the DC-DC converter 302. Consequently, the amount of inventory is reduced, the standardization of the components is improved, and the cost is reduced.

In addition, since there is no need to provide a dedicated IC terminal for switching between the latch system and the automatic return system, the size of the IC can be reduced. Effective use of the terminals of the IC makes it possible to improve the function of the IC.

The latch system and the automatic return system can be switched by merely connecting the Zener diode to the terminal of the IC as a peripheral circuit. Thus, the normal operation of the IC is not adversely affected.

In addition, combining the functions associated with the terminals of the IC makes it possible to hide the functions and also to prevent counterfeiting of the IC.

Figure 8:
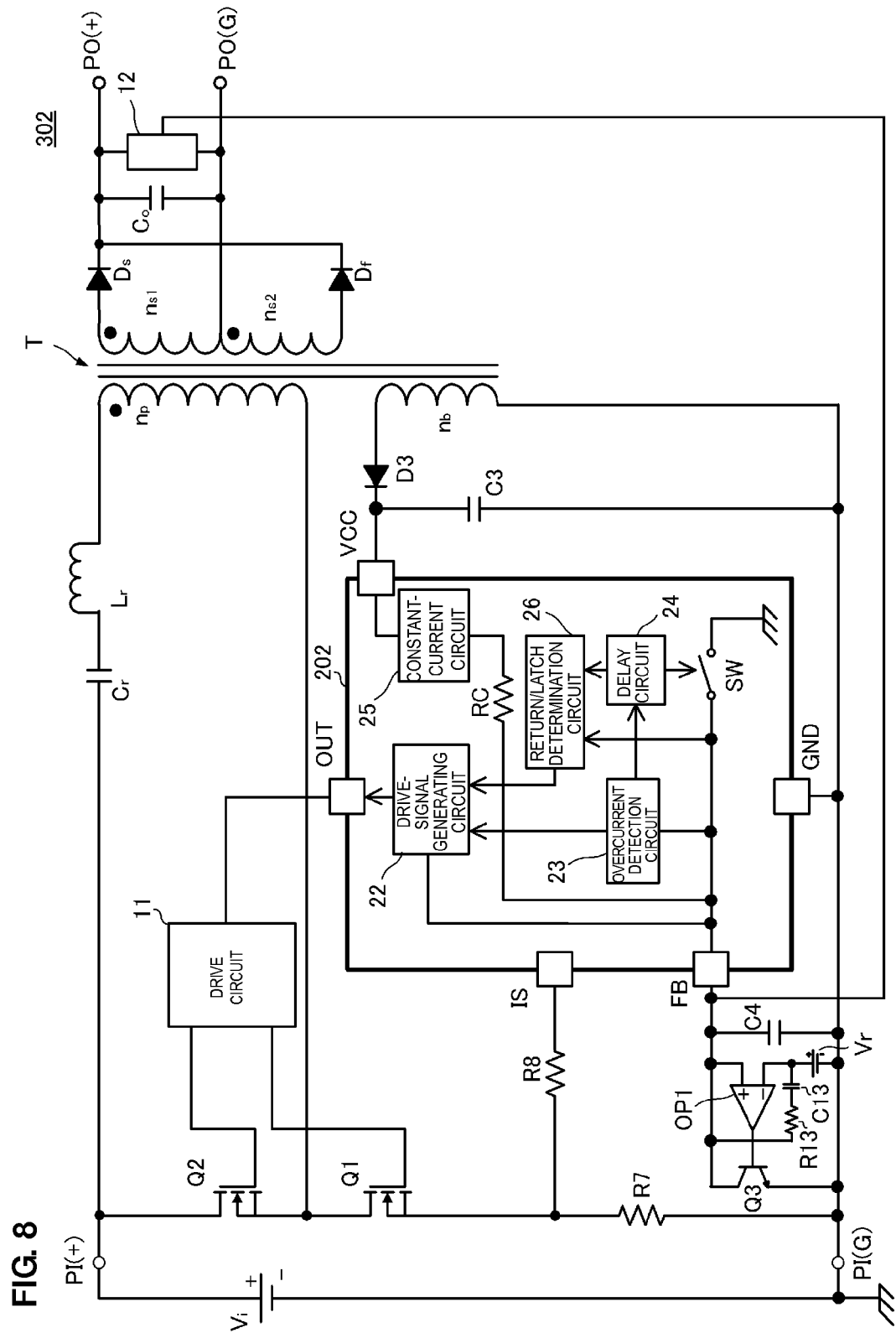
FIG. 8 is a diagram showing an example of another external circuit connected to an outside of the feedback terminal.

FIG. 8 is a diagram showing an example of another external circuit connected to outside of the feedback terminal FB. In the example of FIG. 8, an external circuit including an operational amplifier OP1, a reference-voltage generating circuit Vr, a resistor R13, a capacitor C13, and a transistor Q3 is preferably connected to the feedback terminal FB. The operational amplifier OP1, the reference-voltage generating circuit Vr, and the transistor Q3 preferably operate as a constant-voltage circuit. The resistor R13 and the capacitor C13 preferably function as a filter circuit arranged to prevent malfunction due to noise components superimposed on the voltage of the feedback terminal FB.

As described above, the external circuit may preferably include active elements, such as an operational amplifier and a transistor, for example.

The configuration described above is applicable not only to an overcurrent operation, but also to an operation in switching between the automatic return system and the latch system is selected in an overvoltage state.

Third Preferred Embodiment

Figure 9:
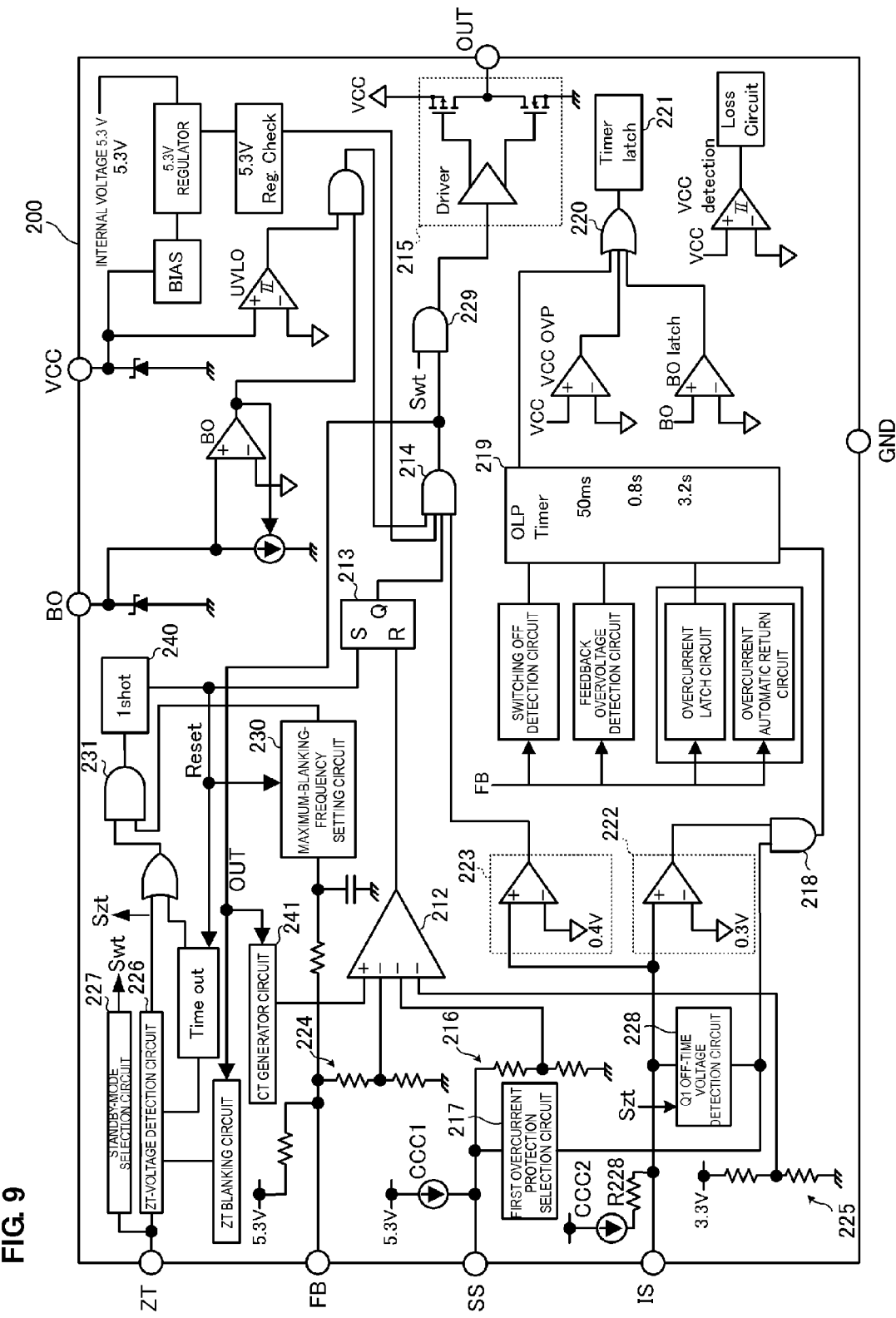
FIG. 9 is a block diagram showing an internal configuration of a switching control IC included in a DC-DC converter according to a third preferred embodiment of the present invention.

FIG. 9 is a block diagram showing an internal configuration of a switching control IC 200 included in a DC-DC converter according to a third preferred embodiment of the present invention.

In FIG. 9, when the standby mode is on, a maximum-blanking-frequency setting circuit 230 preferably sets a maximum blanking frequency in accordance with a voltage of a feedback terminal FB (a hidden function of ON/OFF of the standby mode is accomplished at a ZT terminal described below). The maximum-blanking-frequency setting circuit 230 also reads the voltage of the feedback terminal FB when the converter is started. Now, a description will be given of a case in which the read voltage value is less than or equal to a predetermined value.

Based on the voltage at the ZT terminal, a ZT-voltage detection circuit 226 detects that the voltage across the drive winding nb of the transformer T is reversed and issues a trigger to a one-shot circuit 240. The maximum-blanking-frequency setting circuit 230 preferably changes the output thereof to a low level to thereby cause an output of an AND gate 231 to become a low level, so that a blanking time during which a low level at an OUT terminal is maintained is determined. Consequently, the switching frequency is determined.

When the voltage of the feedback terminal FB exceeds about 1 V, for example, the upper-limit frequency is, for example, about 250 kHz and a switching frequency that is less than or equal to the upper-limit frequency is determined in accordance with the voltage of the feedback terminal FB. When the voltage of the feedback terminal FB is about 1 V or less, for example, the switching frequency is set to less than or equal to about 250 kHz, for example, which is the upper-limit frequency, in accordance with the blanking time. In the present preferred embodiment, for example, the switching frequency is about 1 kHz, for example, when the voltage of the feedback terminal FB is about 0.4 V.

When the voltage of the feedback terminal FB is about 1 V or less, the maximum-blanking-frequency setting circuit 230 shown in FIG. 9 performs setting so that the blanking frequency determined according to the blanking time changes linearly from about 250 kHz to about 1 kHz with respect to a change in the voltage of the feedback terminal FB from about 1 V to about 0.4 V, for example. Thus, the amount of load decreases and the switching frequency decrease as the voltage of the feedback terminal FB decreases, so that the operation enters a standby mode in which the switching frequency is reduced. This arrangement helps to reduce loss at low load.

On the other hand, when the value of the voltage of the feedback terminal FB, the value being read by the maximum-blanking-frequency setting circuit 230 during the startup of the converter, is less than or equal to a predetermined voltage value, an operation as described below is performed.

When the voltage of the feedback terminal FB is about 1 V or less, for example, the maximum-blanking-frequency setting circuit 230 shown in FIG. 9 performs setting so that the ratio of an oscillation period changes linearly from 1 to 0 with respect to a change in the voltage of the feedback terminal FB from about 1 V to about 0.4 V, by changing the ratio of the oscillation period in which the oscillation continues to a stop period in which the switching operation stops. Thus, as the amount of load decreases to reduce the voltage of the feedback terminal FB, the rate of the oscillation period decreases, so that the operation enters an intermittent-oscillation standby mode. This arrangement helps to reduce loss at low load.

Fourth Preferred Embodiment

Figure 10:
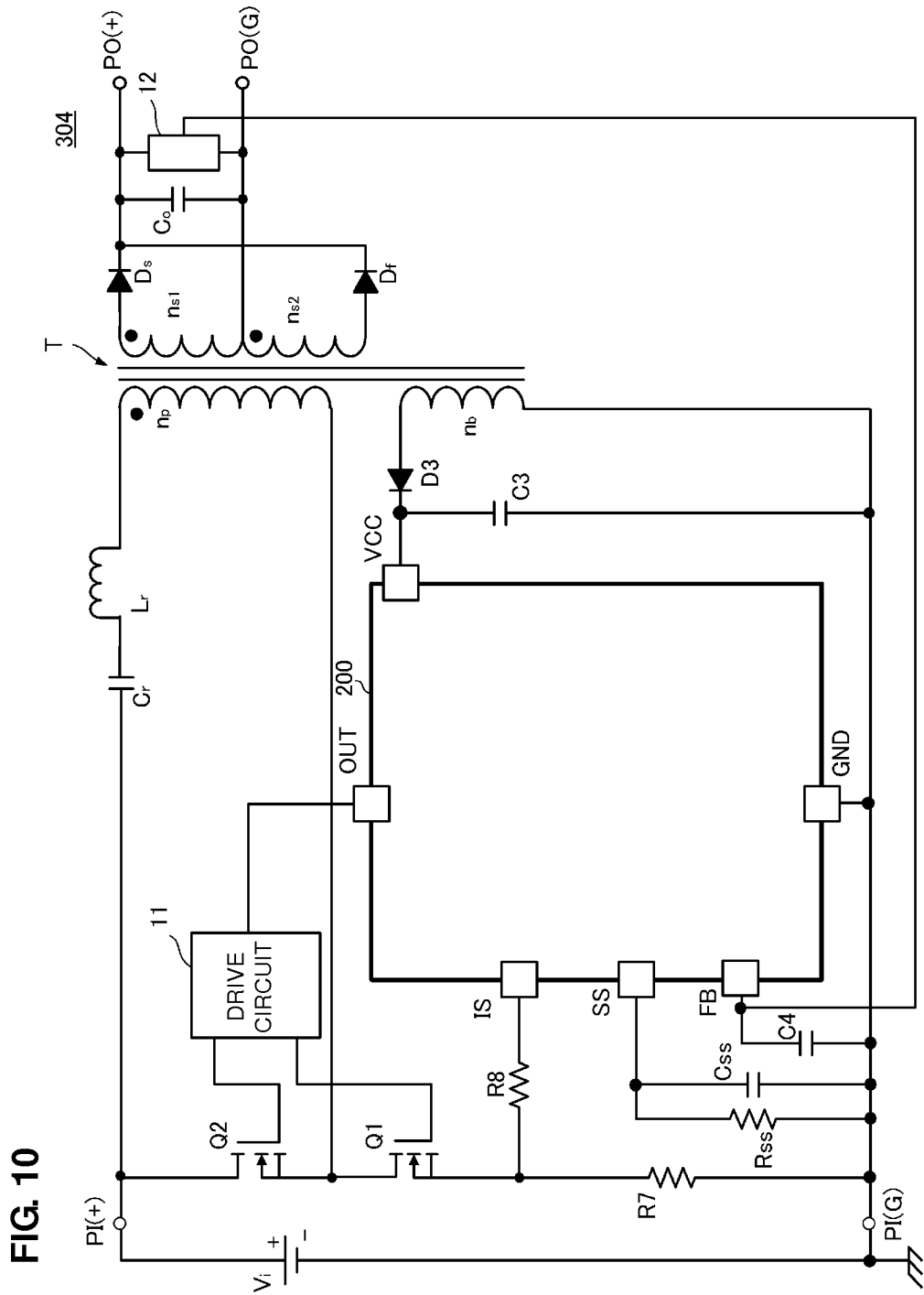
FIG. 10 is a circuit diagram of a DC-DC converter according to a fourth preferred embodiment of the present invention.

FIG. 10 is a circuit diagram of a DC-DC converter 304 according to a fourth preferred embodiment of the present invention.

The DC-DC converter 304 is one example of the switching control device according to a preferred embodiment of the present invention and includes a switching control IC 200 corresponding to the switching control circuit according to a preferred embodiment of the present invention.

A voltage of DC input power supply Vi is input between an input terminal PI(+) and an input terminal PI(G) of the DC-DC converter 304. A load is connected between an output terminal PO(+) and an output terminal PO(G) of the DC-DC converter 304. A predetermined DC voltage is output to the load.

Differences between the third preferred embodiment and the second preferred embodiment shown in FIG. 5 are the configuration of the switching control IC 200 and a structure in which an external circuit including a resistor Rss and a capacitor Css is connected between a soft start terminal SS and ground GND.

In FIG. 10, the original function of the soft start terminal SS of the switching control IC 200 is to cause a soft start operation. The term "soft start" refers to control to gradually increase the ON duration of an output pulse to drive switching elements Q1 and Q2 during startup of the converter. The speed of the soft start is set according to the time constant of the external circuit connected to the soft start terminal SS. More specifically, a constant-current circuit is connected to the soft start terminal SS and a charging time constant for the external capacitor Css for the soft start terminal SS is specified according to the capacitance of the capacitor Css.

The internal configuration of the switching control IC 200 is substantially the same as the internal configuration shown in FIG. 9. Referring to FIG. 9, the one-shot circuit 240 preferably sets a flip-flop 213, so that a Q output signal of the flip-flop 213 is output to an AND gate 214 and is then output to the OUT terminal via a drive 215 as a high-level gate control voltage.

A CT generator circuit 241 preferably outputs a lamp waveform voltage after the output of the AND gate 214 becomes a high level. When the voltage output from the CT generator circuit 241 exceeds a lowest one of voltages input to three negative (−) terminals of a comparator 212, the comparator 212 resets the flip-flop 213. As a result of the resetting, the voltage of the OUT terminal is returned to the low level.

The above-described operation is preferably repeated to change the waveform of the voltage output from the OUT terminal to a substantially rectangular waveform, for example.

A constant-current circuit CCC1 is preferably connected to the soft start terminal SS. Since the capacitor Css is connected to the soft start terminal SS, as shown in FIG. 10, the voltage at the soft start terminal SS preferably becomes equal or substantially equal to the charging voltage of the capacitor Css. As the voltage of the soft start terminal SS increases, the timing at which the output of the comparator 212 is reversed is delayed and the ON time of the switching element increases gradually. With this arrangement, the soft start operation is started.

As shown in FIG. 10, when the resistor Rss is externally connected to the soft start terminal SS, the voltage at the soft start terminal SS is determined according to the resistance value of the resistor Rss when the capacitor Css is fully charged.

During the soft start period, the voltage output from a resistance dividing circuit 216 is the lowest among voltages input to the three negative (−) terminals of the comparator 212. Thus, the soft start operation is performed as described above. When the soft start operation is completed, the voltage output from a resistance dividing circuit 224 becomes the lowest among the voltages input to the three negative (−) terminals of the comparator 212. Thus, the ON time of the switching element is determined according to a voltage applied to a feedback terminal FB. When the voltage of the feedback terminal FB exceeds the voltage applied to the SS terminal and determined according to the resistance value of the external resistor Rss (i.e., exceeds the voltage of about 3.3 V or less at a resistance dividing circuit 225), the voltage applied to the SS terminal becomes the lowest among the voltages input to the three negative (−) terminals of the comparator 212, rather than the output voltage of the resistance dividing circuit 225. Thus, control is performed so that the ON time does not further increase, and a maximum ON time or a maximum duty ratio is set.

For example, when a threshold is about 4 V and the voltage at the soft start terminal SS exceeds about 4 V, a first overcurrent protection selection circuit 217 activates an AND gate 218 to thereby enable an output of a first overcurrent detection circuit 222. When the voltage at an IS terminal exceeds about 0.3 V, for example, the first overcurrent detection circuit 222 changes the output to a high level to start a timer operation of an overcurrent protection timer 219. When the output of the first overcurrent detection circuit 222 becomes a high level and the high-level state continues for about 50 ms, for example, the overcurrent protection timer 219 causes a timer latch 221 to perform latching via an OR gate 220. The timer latch 221 causes the switching of the switching element to stop for about 3.2 s, for example. As a result, first overcurrent protection is performed.

With this arrangement, a maximum ON time or a maximum duty ratio is preferably set in accordance with the resistance value of the external resistor Rss.

When the voltage at the IS terminal enters a state of overcurrent greater than about 0.4 V, for example, an output of a second overcurrent detection circuit 223 becomes a high level to thereby force the switching operation to stop.

Fifth Preferred Embodiment

Figure 11:
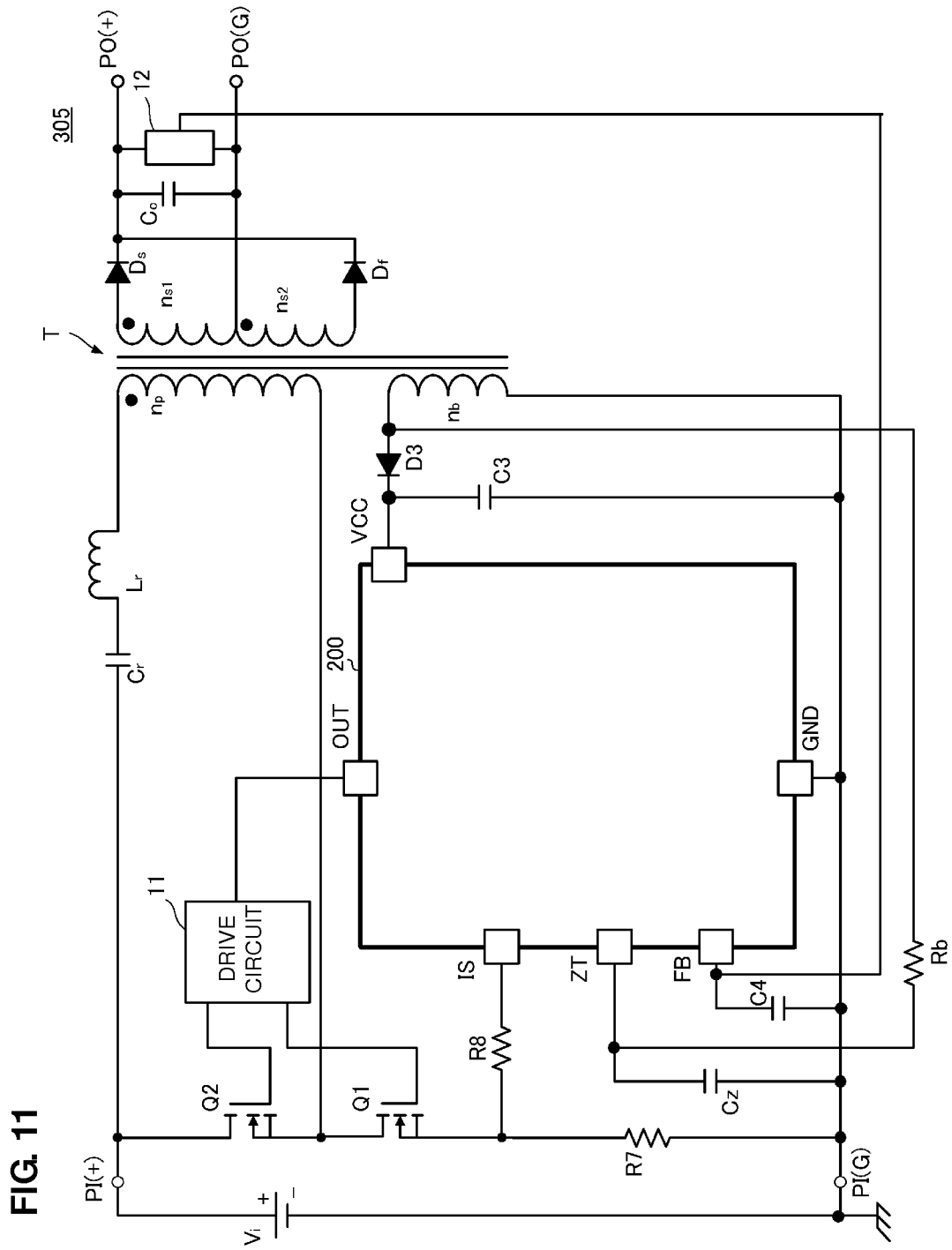
FIG. 11 is a circuit diagram of a DC-DC converter according to a fifth preferred embodiment of the present invention.

FIG. 11 is a circuit diagram of a DC-DC converter 305 according to a fifth preferred embodiment of the present invention.

The DC-DC converter 305 is one example of the switching control device according to a preferred embodiment of the present invention and includes a switching control IC 200 corresponding to the switching control circuit according to a preferred embodiment of the present invention.

A voltage of DC input power supply Vi is preferably input between an input terminal PI(+) and an input terminal PI(G) of the DC-DC converter 305. A load is preferably connected between an output terminal PO(+) and an output terminal PO(G) of the DC-DC converter 305. A predetermined DC voltage is preferably output to the load.

Differences between the fifth preferred embodiment and the second preferred embodiment shown in FIG. 5 are the configuration of the switching control IC 200 and a structure in which an external circuit including a capacitor Cz is preferably connected between a polarity detection terminal ZT of the switching control IC 200 and ground GND.

The polarity detection terminal ZT is used to detect a reversal of the polarity of the voltage of the winding of the transformer T. A signal input from the drive winding nb of the transformer T to the polarity detection terminal ZT is an ON/OFF pulse voltage. This ON/OFF pulse voltage is based on the polarity reversal of the voltage of the winding.

The voltage waveform peak value of the pulse voltage input to the polarity detection terminal ZT is preferably set by determining the ratio of the number of turns of the primary winding np of the transformer T to the number of turns of the drive winding nb thereof or by providing a resistance dividing circuit, for example.

As shown in FIG. 9, the ZT-voltage detection circuit 226 is connected to the ZT terminal of the switching control IC 200. Based on the voltage of the ZT terminal, the ZT-voltage detection circuit 226 detects a reversal of the voltage across the drive winding nb of the transformer T and issues a trigger to the one-shot circuit 240.

A standby-mode selection circuit 227 is preferably connected to the ZT terminal of the switching control IC 200. When the voltage of the ZT terminal is greater than or equal to a threshold (e.g., about 3.3 V), the standby-mode selection circuit 227 preferably outputs a low-level signal to an AND gate 229 to thereby stop a signal output from the OUT terminal. As a result, the mode is switched to a standby mode. When the voltage of the ZT terminal is less than about 3.3 V, for example, the standby mode is cleared.

Since the signal input to the polarity detection terminal ZT is a pulse signal, the DC-DC converter 305 may preferably be configured so that the standby mode is turned on when four pulses having about 3.3 V or more, for example are counted. Such an arrangement prevents malfunction due to noise.

Sixth Preferred Embodiment

Figure 12:
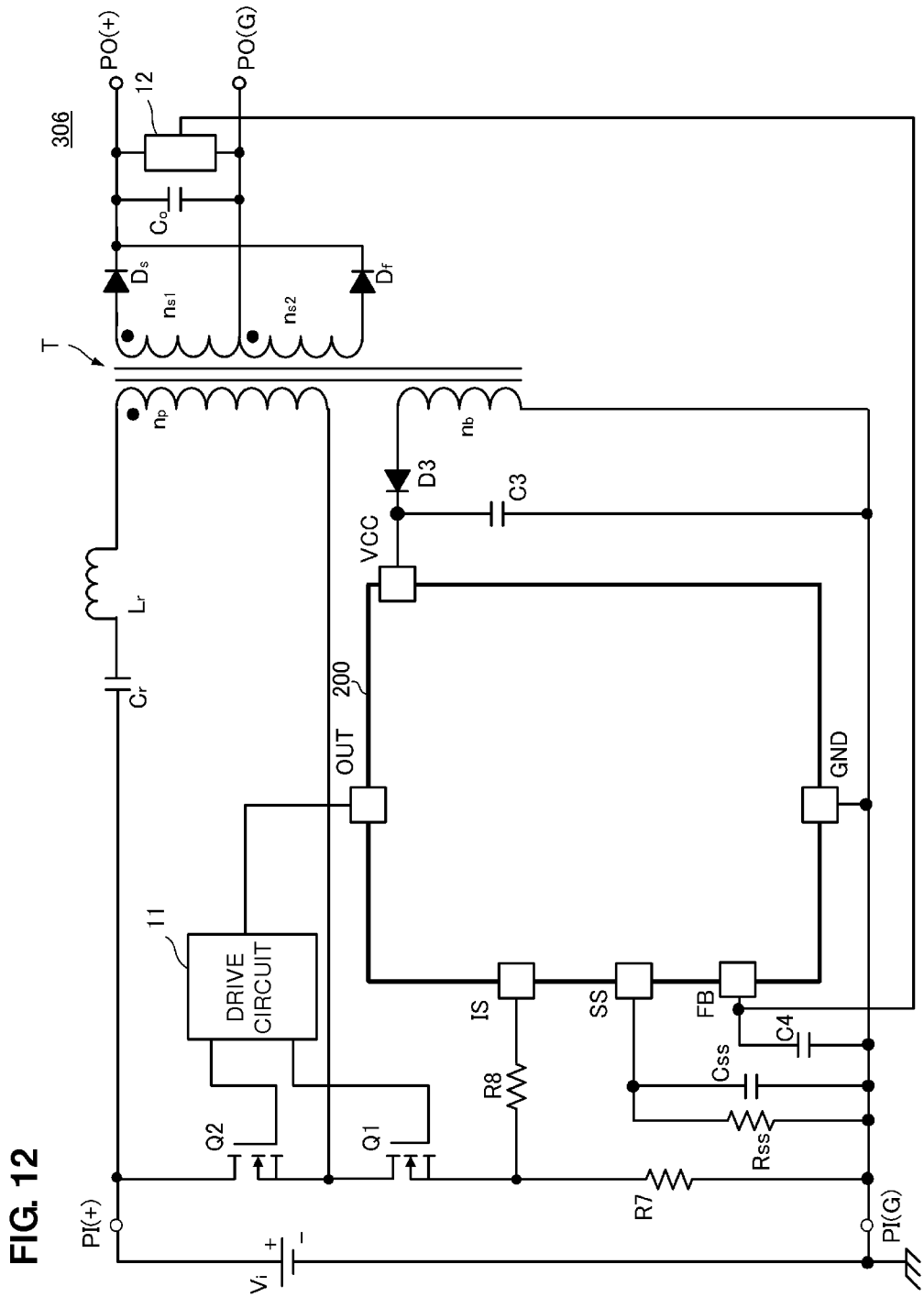
FIG. 12 is a circuit diagram of a DC-DC converter according to a sixth preferred embodiment of the present invention.

FIG. 12 is a circuit diagram of a DC-DC converter 306 according to a sixth preferred embodiment of the present invention.

The DC-DC converter 306 is one example of the switching control device according to a preferred embodiment of the present invention and includes a switching control IC 200 corresponding to the switching control circuit according to a preferred embodiment of the present invention.

In the DC-DC converter according to the sixth preferred embodiment, an IS terminal of the switching control IC 200 preferably includes a function other than the current detection (the overcurrent detection) function.

The internal configuration of the switching control IC 200 is substantially the same as the internal configuration shown in FIG. 9. In FIG. 9, the second overcurrent detection circuit 223 connected to the IS terminal performs overcurrent protection when a voltage of the IS terminal reaches a voltage corresponding to the overcurrent state. A Q1 off-time voltage detection circuit 228 detects whether or not the voltage of the IS terminal exceeds a threshold when a switching element Q1 is off and causes a second function to operate.

In FIG. 9, when the voltage of the IS terminal becomes an overcurrent of about 0.4 V or greater, for example, an output of a second overcurrent detection circuit 223 becomes a high level to thereby force the switching operation to stop.

A constant current circuit CCC2 and a resistor R228 are connected to the IS terminal. When the switching element Q1 is off, current flows through the internal resistor R228 and external resistors R8 and R7. Thus, the voltage at the IS terminal preferably becomes equal or substantially equal to a dropped voltage of the resistors R7 and R8.

The Q1 off-time voltage detection circuit 228 inputs, as a timing signal, a signal Szt output from the ZT-voltage detection circuit 226 and compares the voltage of the IS terminal with a threshold during a period in which the switching transistor Q1 is off. For example, when the voltage exceeds the threshold, the Q1 off-time voltage detection circuit 228 outputs a high-level signal to an AND gate 218 to activate a first overcurrent protection mode.

Thus, specifying one or both of the resistance values of the external resistors R8 and R7 makes it possible to define the state of the Q1 off-time voltage detection circuit 228.

This is also applicable to a switching control IC including an overvoltage protection terminal OVP. The original function of the overvoltage protection terminal OVP is to detect that the voltage output to the load becomes an overvoltage and suppresses an increase in the output voltage. The switching control IC may preferably include a circuit arranged to maintain, when the voltage at the overvoltage protection terminal OVP exceeds a set voltage that is greater than a normal range, the voltage at the OUT terminal at the low level and immediately stop the output of the overvoltage.

Seventh Preferred Embodiment

Figure 13:
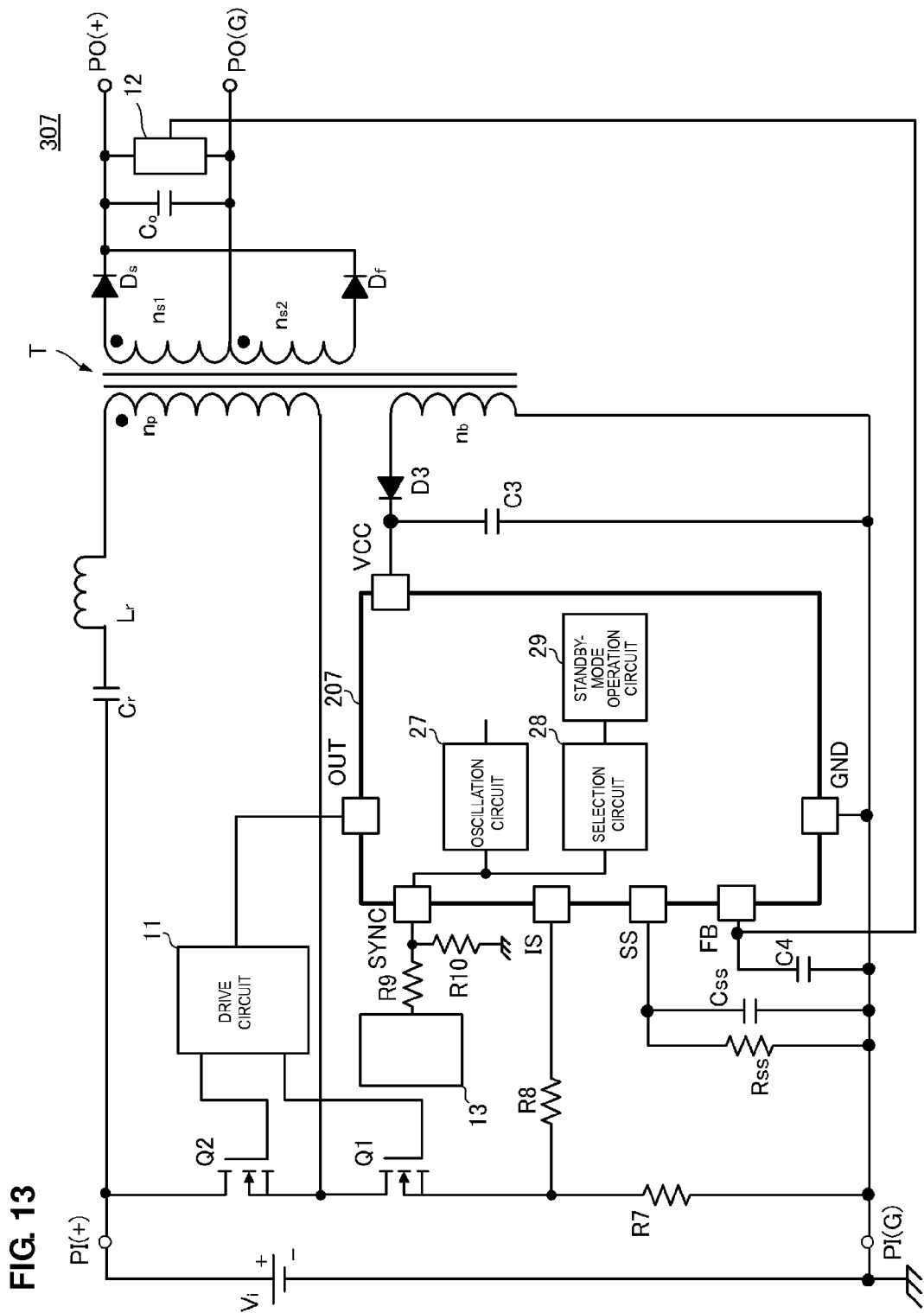
FIG. 13 is a circuit diagram of a DC-DC converter according to a seventh preferred embodiment of the present invention.

FIG. 13 is a circuit diagram of a DC-DC converter 307 according to a seventh preferred embodiment of the present invention.

The DC-DC converter 307 is one example of the switching control device according to a preferred embodiment of the present invention and includes a switching control IC 207 corresponding to the switching control circuit according to a preferred embodiment of the present invention.

In the DC-DC converter according to the seventh preferred embodiment, the switching control IC 207 preferably includes a SYNC terminal that provides a function other than the oscillation synchronization function.

A frequency synchronization signal is preferably input from a synchronization-signal generating circuit 13 to the SYNC terminal. In this example, a substantially triangular wave is input. An internal oscillation circuit 27 preferably oscillates in synchronization with a peak of the substantially triangular wave. Control is performed so that a switching element Q1 is turned on at the rising edge of a rectangle wave signal output from the oscillation circuit 27 and a switching element Q2 is turned on after a predetermined ON time passes.

An internal selection circuit 28 preferably selects enabling/disabling of another function, depending on whether a lower-limit value of the voltage (a substantially triangular wave signal) input to the SYNC terminal exceeds a predetermined threshold. For example, the selection circuit 28 selects ON/OFF of a standby mode. When the lower-limit value of the voltage is greater than or equal to the threshold voltage, the selection circuit 28 preferably activates a standby-mode operation circuit 29. When the feedback voltage is low under a light load, the standby-mode operation circuit 29 preferably performs operation for the standby mode as described in the third preferred embodiment.

Figure 14:
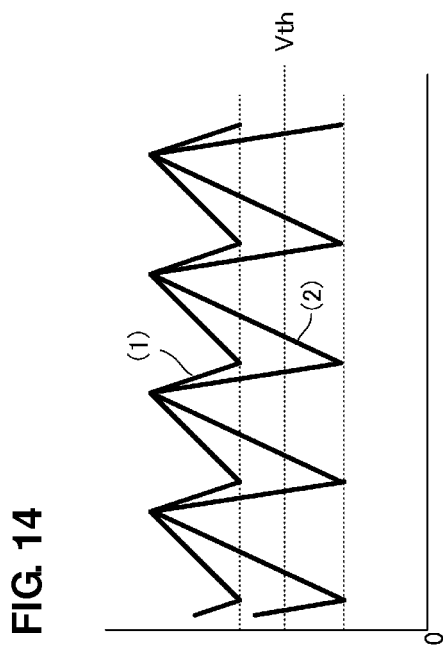
FIG. 14 is a graph showing a change in the lower-limit value of a substantially triangular wave input to a SYNC terminal.

FIG. 14 is a graph showing a change in the lower-limit value of the substantially triangular wave input to the SYNC terminal. Since the lower-limit value of a substantially triangular wave (1) exceeds a threshold voltage Vth, the standby mode is enabled. Since the lower-limit value of a substantially triangular wave (2) does not reach the threshold voltage Vth, the standby mode is disabled.

The lower-limit value of the voltage of the substantially triangular wave input to the SYNC terminal is preferably determined by the resistance values of external resistors R9 and R10. That is, the ON/OFF of the standby mode is preferably selected according to the resistance values of the external resistors R9 and R10, for example.

The arrangement may also be configured such that another function is selected according to the frequency band of the substantially triangular wave input to the SYNC terminal. For example, the selection circuit 28 shown in FIG. 13 preferably counts the period of the substantially triangular wave based on a clock and selects another function depending on whether or not the counted value exceeds a threshold.

The other function is not limited to only the selection of ON/FF of the standby mode, and, for example, latch/automatic-return may be selected during protection operation.

Eighth Preferred Embodiment

Figure 15:
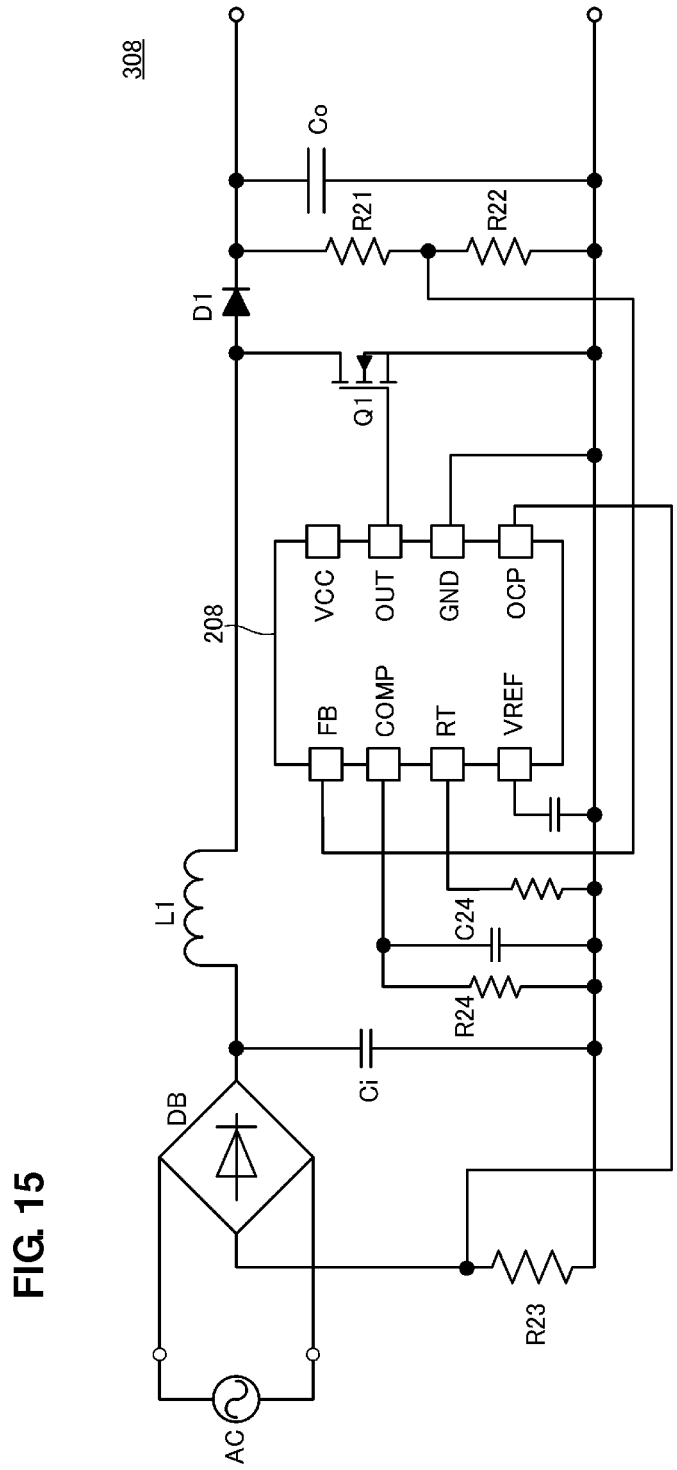
FIG. 15 is a circuit diagram of a PFC converter according to an eighth preferred embodiment of the present invention.

FIG. 15 is a circuit diagram of a PFC converter 308 according to an eighth preferred embodiment of the present invention.

The switching control device 308 preferably includes a switching control IC 208 corresponding to the switching control circuit according to a preferred embodiment of the present invention.

The switching control device 308 preferably includes a step-up chopper circuit including a diode bridge DB, a switching element Q1, a diode D1, and a capacitor Co, for example. The switching control IC 208 preferably receives, at a feedback terminal FB thereof, a detection voltage from an output-voltage detection circuit including resistors R21 and R22 and controls ON/OFF of the switching element Q1 by using a substantially rectangular wave signal output from an OUT terminal. An external resistor R24 and a capacitor C24 arranged to compensate for a gain and a phase of feedback are preferably connected to a COMP terminal.

Figure 16:
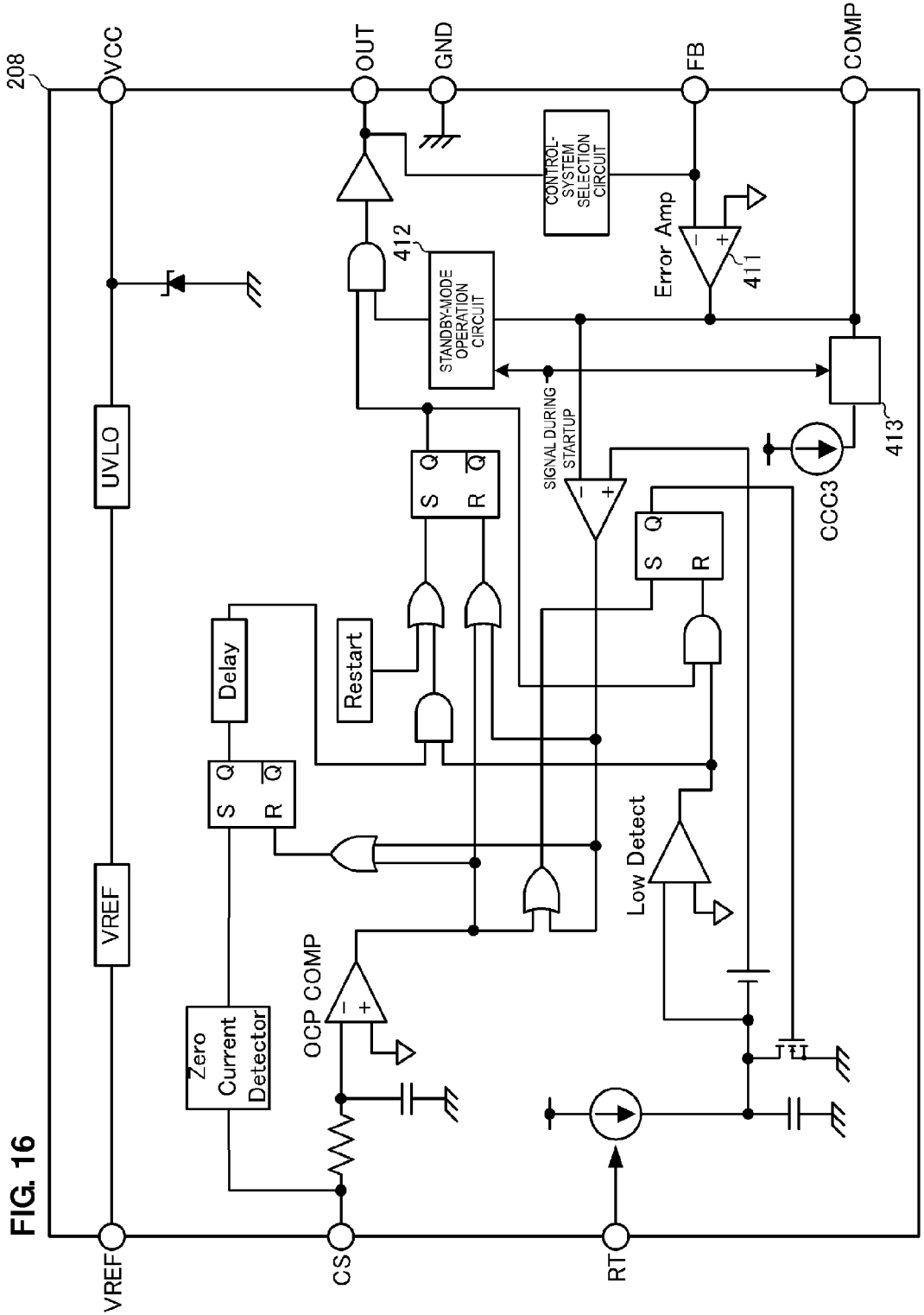
FIG. 16 is a block diagram showing an internal configuration of a switching control IC.

FIG. 16 is a block diagram showing an internal configuration of the switching control IC 208.

The switching control IC 208 preferably includes an error amplifier 411 arranged to amplify a difference between a voltage of an output-voltage detection signal input to the feedback terminal FB and a reference voltage, in order to stabilize the output voltage. The COMP terminal is preferably connected to an output of the error amplifier 411. The resistor R24 and the capacitor C24, which are externally connected to the COMP terminal, preferably set the gain of the error amplifier 411 and the phase of the output signal.

A standby-mode operation circuit 412 is preferably connected to the COMP terminal. A constant current circuit CCC3 is also preferably connected to the COMP terminal via a switch 413. The switch 413 is turned on upon startup. When the voltage of the COMP terminal is greater than or equal to a predetermined threshold voltage, the standby-mode operation circuit 412 enters a standby mode, i.e., a mode in which output of the substantially rectangular wave from the OUT terminal is stopped.

Ninth Preferred Embodiment

Figure 17:
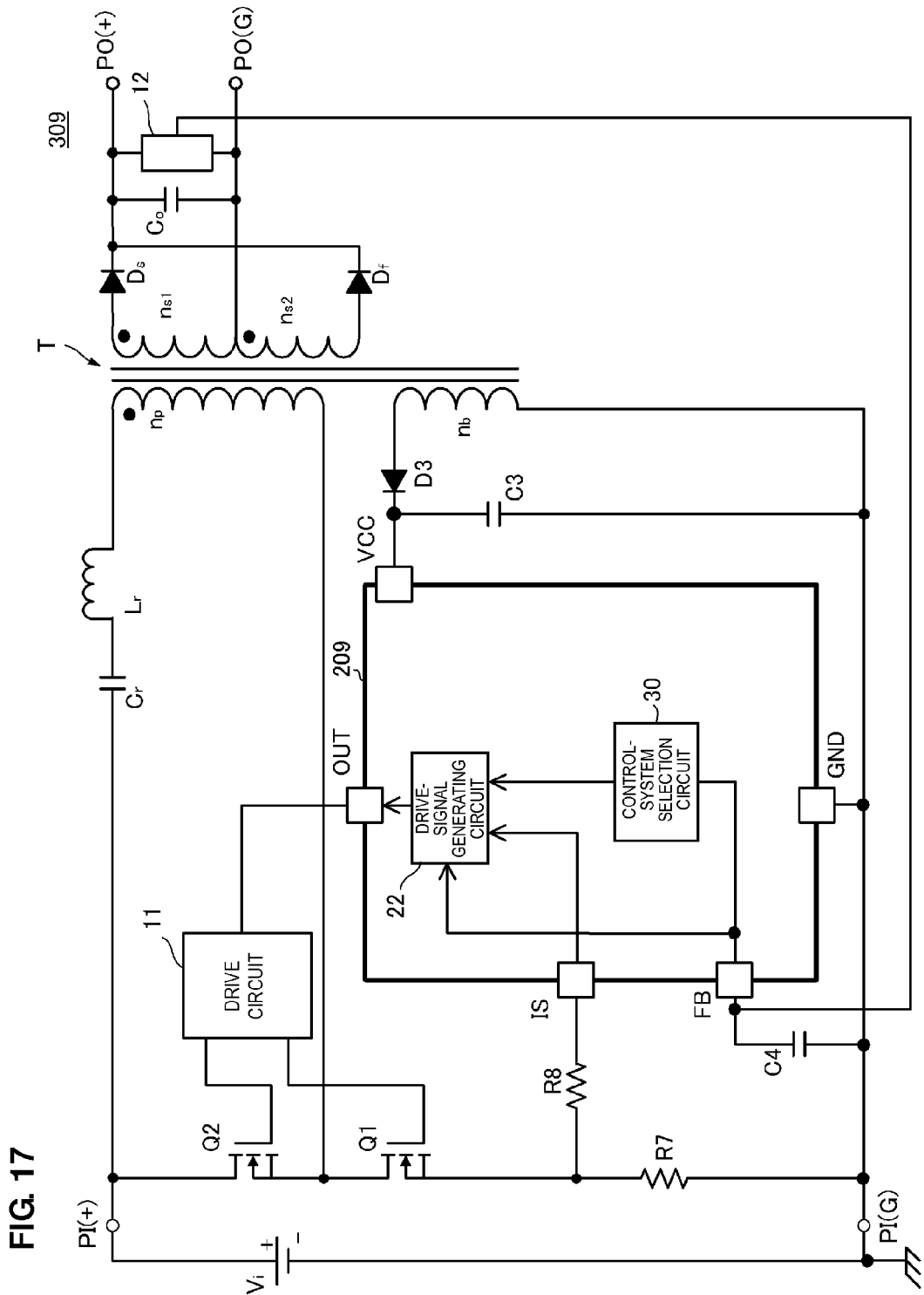
FIG. 17 is a circuit diagram of a DC-DC converter according to a ninth preferred embodiment of the present invention.

FIG. 17 is a circuit diagram of a DC-DC converter 309 according to a ninth preferred embodiment of the present invention.

The DC-DC converter 309 preferably includes a switching control IC 209 corresponding to the switching control circuit according to a preferred embodiment of the present invention.

A voltage of DC input power supply Vi is preferably input between an input terminal PI(+) and an input terminal PI(G) of the DC-DC converter 309. A load is preferably connected between an output terminal PO(+) and an output terminal PO(G) of the DC-DC converter 309. A predetermined DC voltage is preferably output to the load.

A first series circuit including a capacitor Cr, an inductor Lr, a primary winding np of a transformer T, a first switching element Q1, and a current-detection resistor R7 that are connected in series is preferably provided between the input terminal PI(+) and the input terminal PI(G). The first switching element Q1 preferably includes an FET, for example. Preferably, a drain terminal of the first switching element Q1 is connected to the primary winding np of the transformer T and a source terminal of the first switching element Q1 is connected to the current-detection resistor R7.

A second series circuit including a second switching element Q2, the capacitor Cr, and the inductor Lr that are connected in series is preferably connected to two opposite ends of the primary winding np of the transformer T.

Secondary windings ns1 and ns2 of the transformer T preferably include a first rectifying/smoothing circuit including diodes Ds and Df and a capacitor Co. The first rectifying/smoothing circuit rectifies full waves of an AC voltage output from the secondary windings ns1 and ns2, smoothes the rectified voltage, and outputs the smoothed voltage to the output terminals PO(+) and the PO(G).

A rectifying/smoothing circuit including a diode D3 and a capacitor C3 is preferably connected to a first drive winding nb of the transformer T. The rectifying/smoothing circuit provides a DC voltage, which is supplied between a GND terminal and a VCC terminal of the switching control IC 209 as a power-supply voltage.

The switching control IC 209 preferably outputs, from an OUT terminal thereof, a substantially rectangular wave signal to a drive circuit 11, for example. The drive circuit 11 performs control so that the first switching element Q1 and the second switching element Q2 are alternately turned on and off. A dead-time period is preferably provided so as to prevent the switching elements Q1 and Q2 from being simultaneously turned on.

The switching control IC 209 preferably includes a current detection terminal IS to which a resistor R8 is connected so that a dropped voltage of the current-detection resistor R7 is input to the current detection terminal IS.

A feedback circuit 12 is provided between the output terminals PO(+) and PO(G) and the switching control IC 202. The feedback circuit 12 preferably defines a circuit that generates a feedback signal by comparing a voltage division value of a voltage between the output terminals PO(+) and the PO(G) with a reference voltage and that inputs a feedback voltage to a feedback terminal FB of the switching control IC 202 in an insulated state.

The configuration of the feedback circuit 12 is preferably substantially the same as the configuration described in the second preferred embodiment with reference to FIG. 6. The feedback circuit 12 operates such that the voltage at the feedback terminal FB decreases as the voltage output to the output terminals PO(+) and PO(G) becomes higher than a preset voltage.

The switching control IC 209 preferably includes a drive-signal generating circuit 22 arranged to generate a drive signal corresponding to the feedback signal input to the feedback terminal FB, in order to stabilize the output voltage. The feedback control IC 209 preferably further includes a control-system selection circuit 30 that detects the voltage of the feedback signal input to the feedback terminal FB and that controls a control system on the basis of the detected voltage. For example, when the voltage of the feedback signal input to the feedback terminal FB is a voltage corresponding to a normal load, the control-system selection circuit 30 preferably controls the drive-signal generating circuit 22 so that the operation is performed in a constant-voltage control mode. When the voltage of the feedback signal input to the feedback terminal FB is a voltage corresponding to an overload, the control-system selection circuit 30 preferably controls the drive-signal generating circuit 22 so that the operation is performed in a constant-power control mode. When a greater overload is detected, the mode changes to a constant current control mode.

Figure 18:
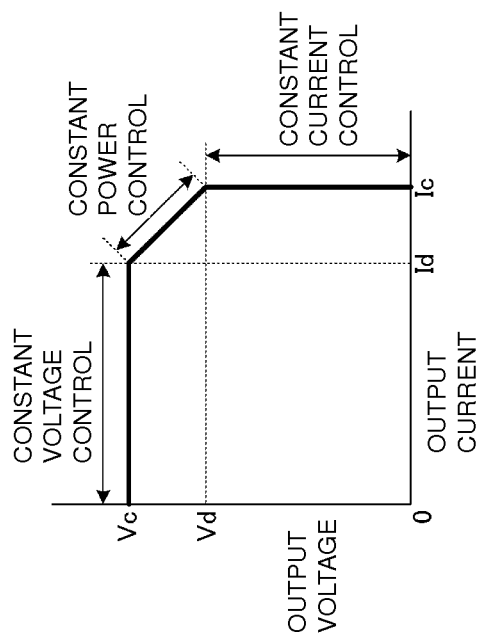
FIG. 18 is a graph showing a change of an operation mode of the DC-DC converter according to the ninth preferred embodiment of the present invention.

FIG. 18 is a graph showing a change in the operation mode. When the output current is in the range of 0 to Id, for example, constant-voltage control is performed so that the output voltage is maintained at a constant voltage Vc. When the output current is in the range of Id to Ic, for example, constant-power control is performed so that the output power becomes constant. When the output voltage reaches Vd and the output current reaches Ic, constant-current control is performed so that the output current becomes a constant current Ic.

When the output current changes in the range of 0 to Id, the output voltage is maintained at Vc when the voltage (the voltage of the feedback signal) input to the feedback terminal FB is in the range of about 0.4 V to about 3.3 V, for example. When the voltage of the feedback terminal FB exceeds about 3.3 V, for example, i.e., when the output current exceeds Id, the maximum ON time is restricted, the output power is restricted to a constant level, and the output voltage is restricted. When the voltage of the feedback terminal FB exceeds about 3.5 V, for example, control is performed so as to reduce the ON time so that the output current is maintained at Ic.

Tenth Preferred Embodiment

Figure 19:
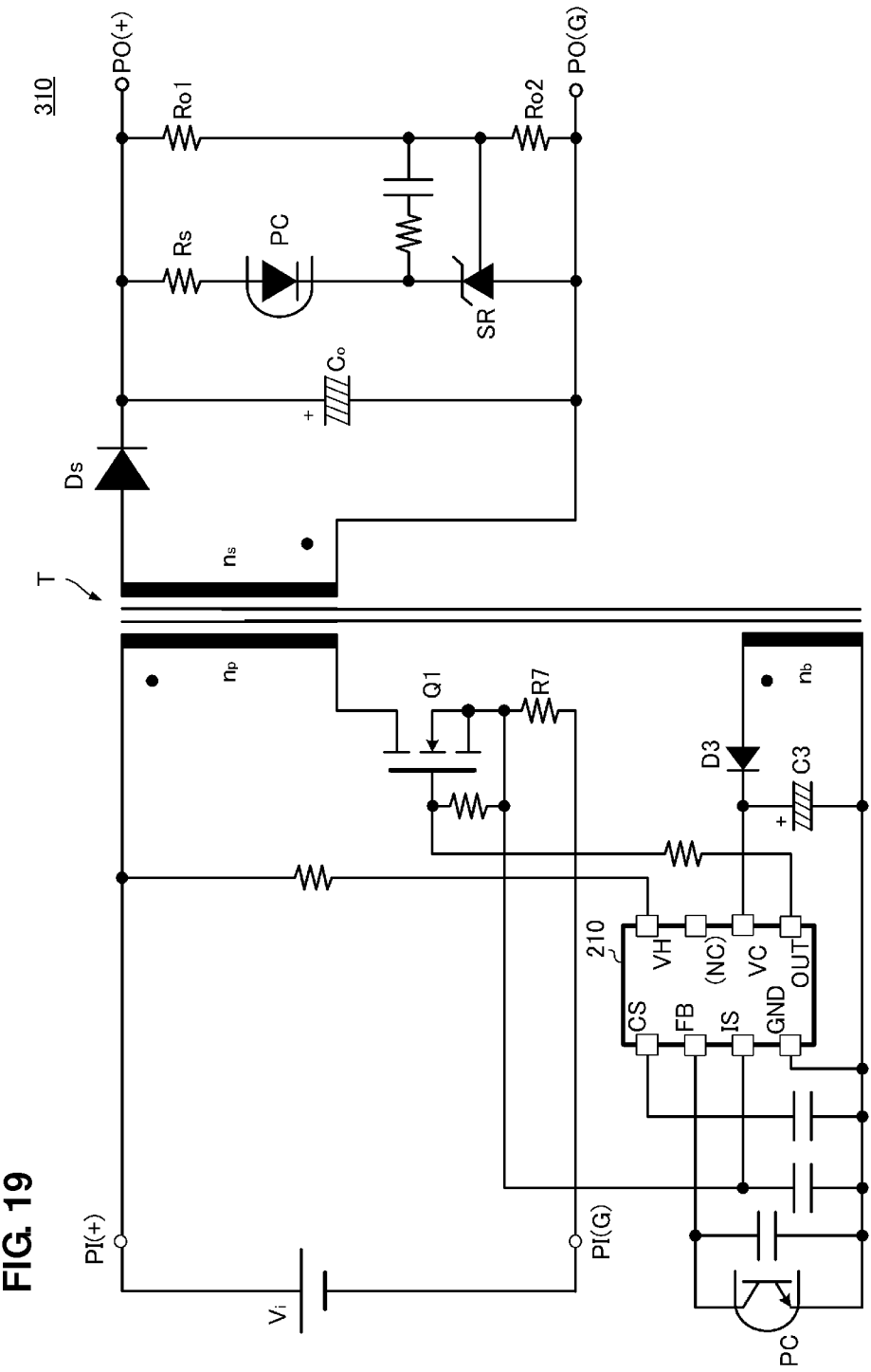
FIG. 19 is a circuit diagram of a DC-DC converter according to a tenth preferred embodiment of the present invention.

FIG. 19 is a circuit diagram of a DC-DC converter 310 according to a tenth preferred embodiment of the present invention.

The DC-DC converter 310 is one example of the switching control device according to a preferred embodiment of the present invention and preferably includes a switching control IC 210 corresponding to the switching control circuit according to a preferred embodiment of the present invention.

A voltage of a direct-current input power supply Vi is input between an input terminal PI(+) and an input terminal PI(G) of the DC-DC converter 310. A load is connected between an output terminal PO(+) and an output terminal PO(G) of the DC-DC converter 310. A predetermined DC voltage is output to the load.

A primary winding np of a transformer T, a switching element Q1, and a current-detection resistor R7 are preferably connected in series between the input terminal PI(+) and the input terminal PI(G). The switching element Q1 preferably includes an FET, for example. Preferably, a drain terminal of the switching element Q1 is connected to the primary winding np of the transformer T and a source terminal of the switching element Q1 is connected to the current-detection resistor R7.

A secondary winding ns of the transformer T preferably includes a rectifying/smoothing circuit including a diode Ds and a capacitor Co. Preferably, the rectifying/smoothing circuit rectifies full waves of an AC voltage output from the secondary windings ns, smoothes the rectified voltage, and outputs the smoothed voltage to the output terminals PO(+) and the PO(G).

A rectifying/smoothing circuit including a diode D3 and a capacitor C3 is preferably connected to a first drive winding nb of the transformer T. This rectifying/smoothing circuit preferably provides a DC voltage, which is supplied between a GND terminal and a VC terminal of the switching control IC 210, as a power-supply voltage.

The switching control IC 210 preferably outputs, from an OUT terminal thereof, a substantially rectangular wave signal to the switching element Q1.

The switching control IC 210 preferably includes a current detection terminal IS to which a dropped voltage of the current-detection resistor R7 is input.

A feedback circuit is preferably provided between the output terminals PO(+) and PO(G) and the switching control IC 210. The feedback circuit preferably includes a series circuit including a shunt regulator SR, a light-emitting element having a photocoupler PC, and a resistor Rs, a voltage dividing circuit having resistors Ro1 and Ro2, and a light-receiving element having a photocoupler PC connected between a feedback terminal FB and the ground terminal GND of the switching control IC 210.

Figure 20:
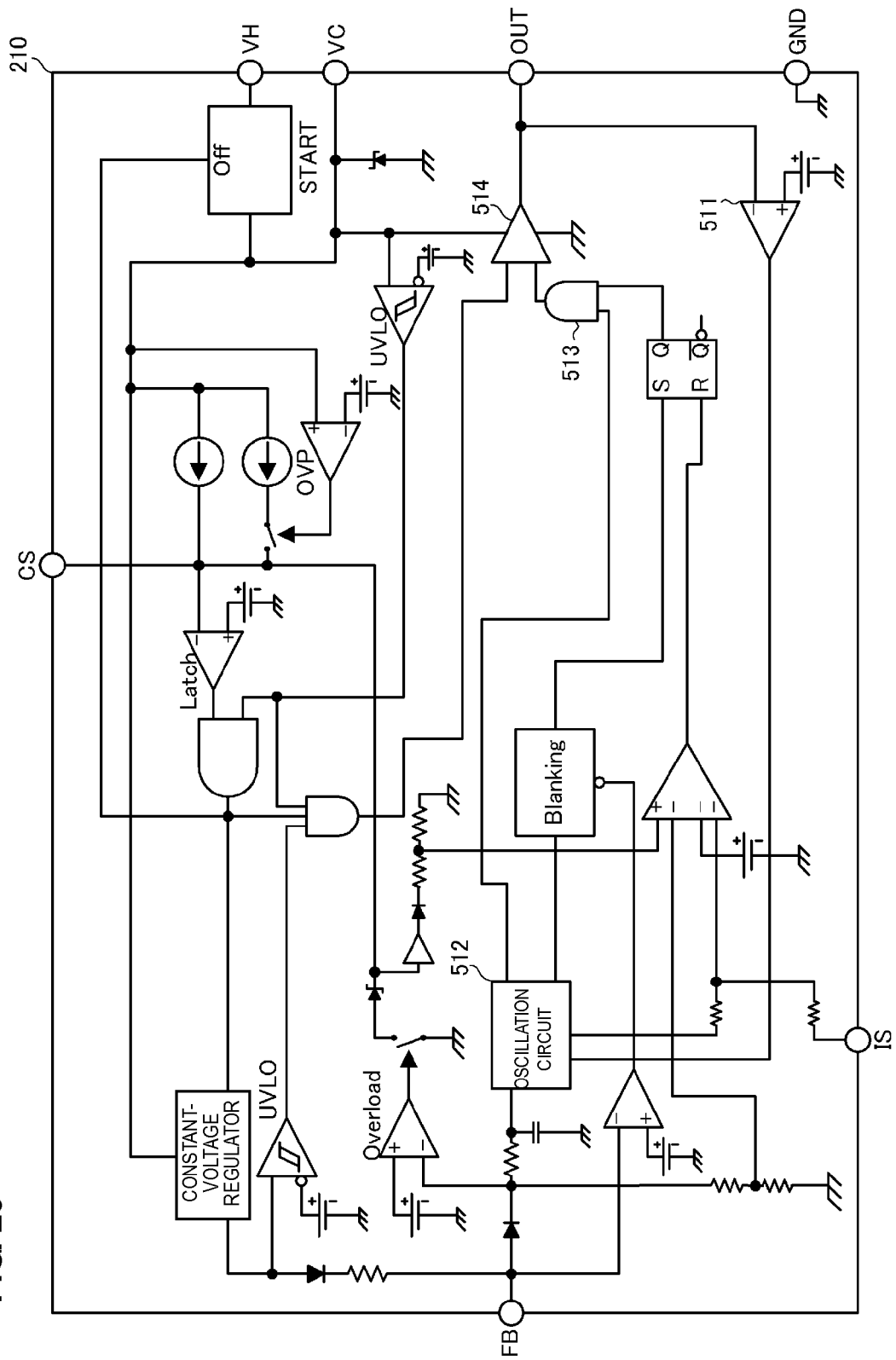
FIG. 20 is a block diagram showing an internal configuration of a switching control IC included in the DC-DC converter according to the tenth preferred embodiment of the present invention.

FIG. 20 is a block diagram showing an internal configuration of the switching control IC 210 included in the DC-DC converter according to the tenth preferred embodiment.

In FIG. 20, a signal output from an oscillation circuit 512 is output from the OUT terminal via an AND gate 513 and an output driver 514. When a comparator 511 detects that the voltage of the OUT terminal is greater than or equal to a predetermined value, it outputs a control signal to the oscillation circuit 512 to switch the switching frequency. For example, when the voltage of the OUT terminal is greater than or equal to the predetermined value, the switching frequency is reduced by about 10 kHz as compared to when the voltage of the OUT terminal is less than the predetermined value.

Accordingly, the arrangement may be configured such that an external circuit is connected to the OUT terminal so that the voltage of the OUT terminal is changed through switching of the external circuit. Thus, the switching of the external circuit enables the switching frequency to be selected.

Since the voltage of the OUT terminal is determined by a power-supply voltage applied to the output driver 514, the arrangement may also be configured such that the power-supply voltage is switched by an external circuit connected to anther terminal. The configuration is not limited to such a configuration in which the switching frequency is selected according to the voltage of the OUT terminal, and the switching frequency may be selected according to a voltage of another terminal. For example, when the switching frequency is selected according to a voltage applied to the power-supply terminal VC, a comparator arranged to detect whether or not the voltage exceeds a predetermined threshold voltage in a voltage range specified by an input voltage specification may preferably be provided to output a control signal to the oscillation circuit 512.

Similarly, the function of selecting the switching frequency can be achieved using an ON/OFF terminal. In addition, the function of selecting the switching frequency can also be achieved using a Valm terminal.

In FIG. 20, the ON/OFF terminal and the Valm terminal are not illustrated. The ON/OFF terminal includes a function of stopping output of a pulse from the OUT terminal through reduction of the potential at the ON/OFF terminal to a ground level. For example, when the operation of the IC is in an overvoltage state or overcurrent state, the Valm terminal enables an alarm indicating that the operation of the power supply is malfunctioning to be issued by increasing the potential of the Valm terminal to a high level.

Eleventh Preferred Embodiment

Figure 21:
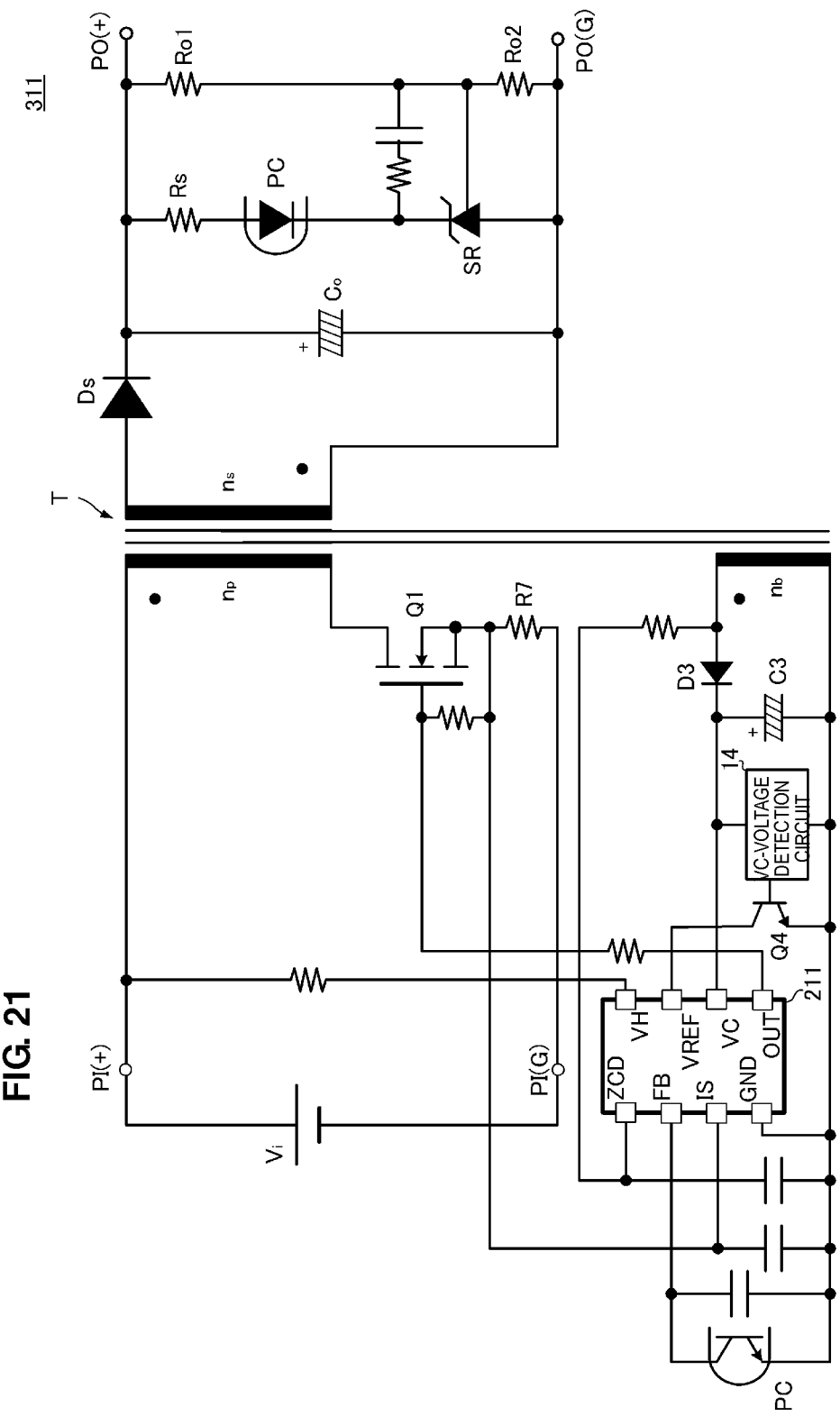
FIG. 21 is a circuit diagram of a DC-DC converter according to an eleventh preferred embodiment of the present invention.

FIG. 21 is a circuit diagram of a DC-DC converter 311 according to an eleventh preferred embodiment of the present invention.

The DC-DC converter 311 is one example of the switching control device according to a preferred embodiment of the present invention and preferably includes a switching control IC 211 corresponding to the switching control circuit according to a preferred embodiment of the present invention.

A voltage of direct-current input power supply Vi is preferably input between an input terminal PI(+) and an input terminal PI(G) of the DC-DC converter 311. A load is connected between an output terminal PO(+) and an output terminal PO(G) of the DC-DC converter 311. A predetermined DC voltage is output to the load.

A primary winding np of a transformer T, a switching element Q1, and a current-detection resistor R7 are preferably connected in series between the input terminal PI(+) and the input terminal PI(G). The switching element Q1 preferably includes an FET, for example. Preferably a drain terminal of the switching element Q1 is connected to the primary winding np of the transformer T and a source terminal of the switching element Q1 is connected to the current-detection resistor R7.

A secondary winding ns of the transformer T is preferably provided with a rectifying/smoothing circuit including a diode Ds and a capacitor Co. Preferably the rectifying/smoothing circuit rectifies full waves of an AC voltage output from the secondary windings ns, smoothes the rectified voltage, and outputs the smoothed voltage to the output terminals PO(+) and the PO(G).

A rectifying/smoothing circuit including a diode D3 and a capacitor C3 is preferably connected to a first drive winding nb of the transformer T. This rectifying/smoothing circuit provides a DC voltage, which is supplied between a GND terminal and a VC terminal of the switching control IC 211 as a power-supply voltage.

The switching control IC 211 preferably outputs, from an OUT terminal thereof, a substantially rectangular wave signal, for example, to the switching element Q1.

The switching control IC 211 preferably includes a current detection terminal IS to which a dropped voltage of the current-detection resistor R7 is input.

A feedback circuit is preferably provided between the output terminals PO(+) and PO(G) and the switching control IC 211. The feedback circuit preferably includes a series circuit including a shunt regulator SR, a light-emitting element including a photocoupler PC, and a resistor Rs, a voltage dividing circuit including resistors Ro1 and Ro2, and a light-receiving element including a photocoupler PC connected between a feedback terminal FB and the ground terminal GND of the switching control IC 211.

An external circuit including a VC-voltage detection circuit 14 and a transistor Q4 is preferably connected to a VREF terminal.

Figure 22:
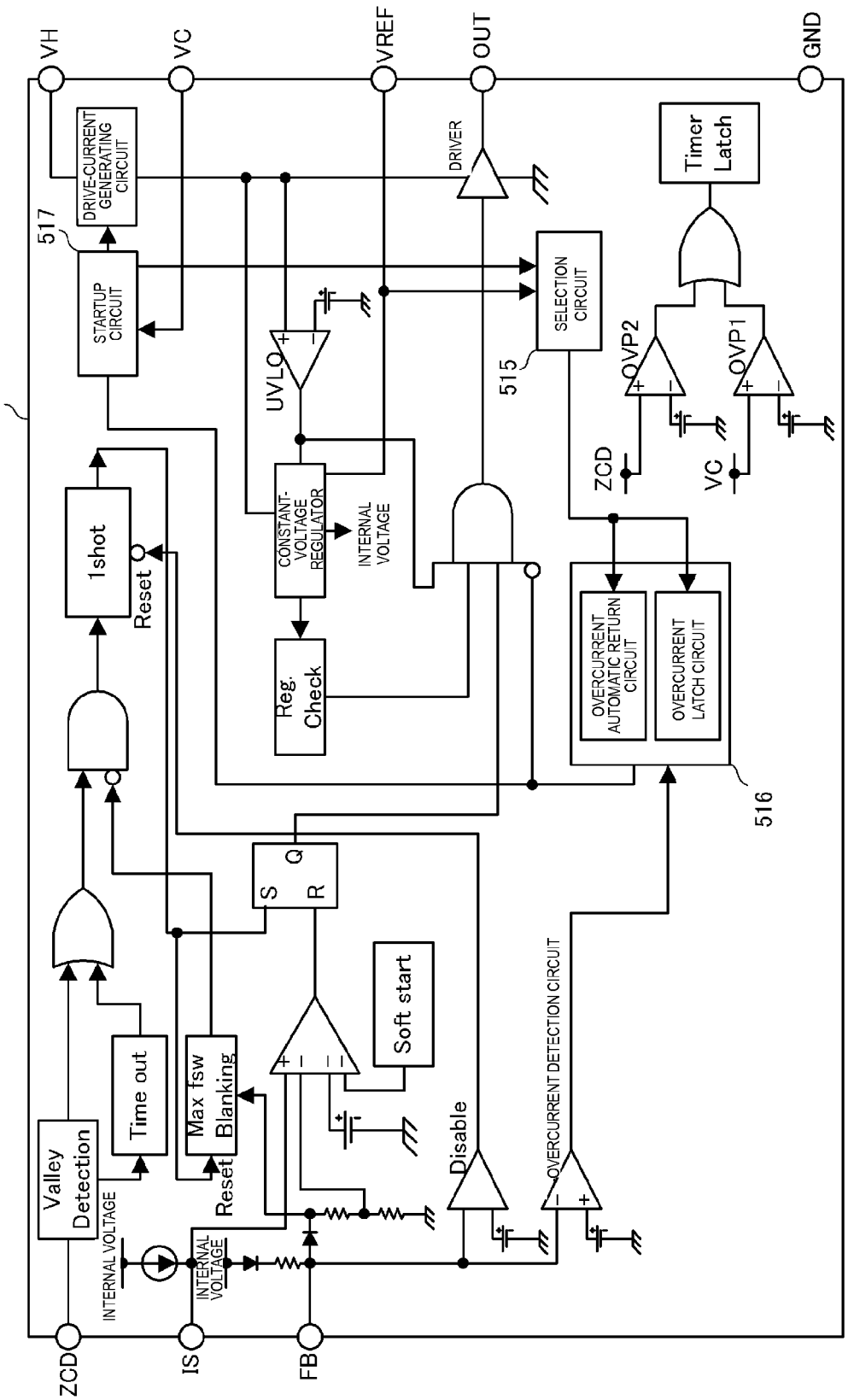
FIG. 22 is a block diagram showing an internal configuration of a switching control IC included in the DC-DC converter according to the eleventh preferred embodiment of the present invention.

FIG. 22 is a block diagram showing an internal configuration of the switching control IC 211 included in the DC-DC converter according to the eleventh preferred embodiment.

In FIG. 22, a first function of the VREF terminal is to output a reference voltage to outside. A second function of the VREF terminal is to select between automatic return and a latch operation upon detection of an overcurrent.

A selection circuit 515 reads a voltage of the VREF terminal when a startup-time signal is output from a startup circuit 517. When the read voltage exceeds a predetermined threshold, the selection circuit 515 activates an overcurrent automatic return circuit. When the read voltage is less than or equal to the threshold voltage, the selection circuit 515 activates an overcurrent latch circuit.

For example, the operation start voltage of the switching control IC 211 is about 10 V and the rated voltage thereof is about 15 V. When the voltage of the VREF terminal immediately after the startup is detected, the voltage of the VC terminal at this point in time is about 10 V. The VC voltage detection circuit 14 shown in FIG. 21 turns on the transistor Q4 when the VC terminal voltage is about 12 V or less, for example. Thus, when the voltage of the VREF terminal is about 12 V or less, the VREF terminal has a GND potential. Since the voltage of the VC terminal immediately after the startup is about 10 V, the VREF terminal has the GND potential and the automatic return mode is selected. When the above-described external circuit is not connected to the VREF terminal, a reference voltage is output to the VREF terminal immediately after the startup of the switching control IC 211 and thus the latch operation mode is selected. That is, one of the latch operation mode and the automatic return mode can be selected depending on the presence/absence of the external circuit.

Although several types of converters have been explained in the above-described preferred embodiments of the present invention, the primary side of the converter is not limited to the current resonant converter. The secondary side of the converter may be a forward converter, as well as a flyback converter. The converter is also applicable to a half-bridge converter, a full-bridge converter, or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching control circuit including a semiconductor integrated circuit arranged to define a power conversion circuit in a switching power-supply apparatus to control a switching element, the semiconductor integrated circuit including external terminals including a power-supply terminal to which a power-supply voltage is applied from outside of the semiconductor integrated circuit to inside of the semiconductor integrated circuit, an input terminal arranged to input a voltage signal from the outside to the inside, and an output terminal arranged to output a voltage signal from the inside to the outside, at least one of the external terminals defining a multifunctional external terminal, the switching control circuit comprising:

a first operation-state setter arranged to set a first operation parameter or first operation mode information of the power conversion circuit or first control of the switching element, based on a signal of the multifunctional external terminal; and a second operation-state setter arranged to detect, as a determination signal, a voltage induced in an external circuit that is connected outside of the multifunctional external terminal and that includes at least a resistance element or a semiconductor element and to set a second operation parameter or second operation mode information of the power conversion circuit in accordance with the determination signal; wherein the second operation-state setter is arranged to set the second operation parameter or the second operation mode information, in accordance with a voltage value of a voltage to be compared, the voltage value being obtained in a period other than a period of a power conversion operation of the power conversion circuit.

2. The switching control circuit according to claim 1, wherein the multifunctional external terminal is the power-supply terminal; and in accordance with the determination signal, the second operation-state setter is arranged to set the second operation parameter or second operation mode information of the power conversion circuit or second control of the switching element.

3. The switching control circuit according to claim 1, wherein
one of signals input to the multifunctional external terminal is an output-voltage detection signal input from the power conversion circuit through an operation of the switching control circuit;
in accordance with the output-voltage detection signal, the first operation-state setter is arranged to set an operation parameter used to perform stabilization control of an output voltage; and
in accordance with the determination signal, the second operation-state setter is arranged to set the second operation parameter or the second operation mode information or second control of the switching element, other than the stabilization of the output voltage.

4. The switching control circuit according to claim 1, wherein
one of signals input to the multifunctional external terminal is a current detection signal resulting from current flowing in the power conversion circuit through an operation of the switching control circuit;
in accordance with the current detection signal, the first operation-state setter is arranged to set an operation parameter or an operation mode during overcurrent control; and
in accordance with the determination signal, the second operation-state setter is arranged to set the second operation parameter or the second operation mode information of the power conversion circuit or second control of the switching element, other than the overcurrent control.

5. The switching control circuit according to claim 1, wherein
one of signals input to the multifunctional external terminal is a voltage pulse output control signal to determine starting or stopping of a voltage pulse output from the multifunctional external terminal in order to operate the switching control circuit;
in accordance with the voltage pulse output control signal, the first operation-state setter is arranged to determine starting or stopping of a voltage pulse output from the multifunctional external terminal; and
in accordance with the determination signal, the second operation-state setter is arranged to set the second operation parameter or the second operation mode information or second control of the switching element, other than the determination of starting or stopping of the voltage pulse.

6. The switching control circuit according to claim 1, wherein
one of signals input to the multifunctional external terminal is an overvoltage detection signal indicating whether or not a voltage output from the power conversion circuit is an overvoltage;
in accordance with the overvoltage detection signal, the first operation-state setter is arranged to perform an overvoltage protection operation; and
in accordance with the determination signal, the second operation-state setter is arranged to set the second operation parameter or the second operation mode information or second control of the switching element, other than the overvoltage protection operation.

7. The switching control circuit according to claim 1, wherein
one of signals input to the multifunctional external terminal is a compensation signal to compensate for a gain and a phase of a feedback signal voltage output from the power conversion circuit through an operation of the switching control circuit;
in accordance with the compensation signal, the first operation-state setter is arranged to compensate for the gain and the phase of the feedback signal voltage; and
in accordance with the determination signal, the second operation-state setter is arranged to set the second operation parameter or the second operation mode information or second control of the switching element, other than the compensation for the gain and the phase of the feedback signal voltage in accordance with the compensation signal.

8. The switching control circuit according to claim 1, wherein
a signal output from the multifunctional external terminal is an operation state signal indicating whether or not an operation state of the power conversion circuit is normal;
the first operation-state setter is arranged to output the operation state signal; and
in accordance with the determination signal, the second operation-state setter is arranged to set the second operation parameter or the second operation mode information or second control of the switching element, other than the outputting of the operation state signal.

9. The switching control circuit according to claim 1, further comprising a current supply circuit arranged to supply current to the multifunctional external terminal to which the external circuit is connected.

10. The switching control circuit according to claim 1, wherein the semiconductor element comprises a Zener diode.

11. The switching control circuit according to claim 1, wherein the semiconductor element comprises a transistor.

12. The switching control circuit according to claim 1, wherein the semiconductor element comprises an operational amplifier.

13. A switching power-supply apparatus wherein the power conversion circuit comprises the switching control circuit according to claim 1.

14. A switching control circuit including a semiconductor integrated circuit arranged to define a power conversion circuit in a switching power-supply apparatus to control a switching element, the semiconductor integrated circuit including external terminals including a power-supply terminal to which a power-supply voltage is applied from outside of the semiconductor integrated circuit to inside of the semiconductor integrated circuit, an input terminal arranged to input a voltage signal from the outside to the inside, and an output terminal arranged to output a voltage signal from the inside to the outside, at least one of the external terminals defining a multifunctional external terminal, the switching control circuit comprising:
a first operation-state setter arranged to set a first operation parameter or first operation mode information of the power conversion circuit or first control of the switching element, based on a signal of the multifunctional external terminal; and
a second operation-state setter arranged to detect, as a determination signal, a voltage induced in an external circuit that is connected outside of the multifunctional external terminal and that includes at least a resistance element or a semiconductor element and to set a second operation parameter or second operation mode information of the power conversion circuit in accordance with the determination signal; wherein in accordance with a voltage waveform, the first operation-state setter is arranged to set the first operation parameter or the first operation mode information or the first control of the switching element; and in accordance with a result of a comparison between a waveform peak value and a reference voltage, the second operation-state setter is arranged to set the second operation parameter or the second operation mode information or second control of the switching element.

15. The switching control circuit according to claim 14, wherein
one of signals input to the multifunctional external terminal is a waveform signal of an input power-supply voltage;
in accordance with the waveform signal, the first operation-state setter is arranged to perform the first control of the switching element; and
in accordance with the determination signal, the second operation-state setter is arranged to set the second operation parameter or second operation mode information of the power conversion circuit or second control of the switching element.

16. The switching control circuit according to claim 14, wherein
a signal output from the multifunctional external terminal is a switching-element control signal to control a voltage of a control terminal of the switching element in order to operate the switching control circuit;
the first operation-state setter is arranged to output the switching-element control signal to the switching element; and
in accordance with the determination signal, the second operation-state setter is arranged to set the second operation parameter or the second operation mode information, other than the outputting of the switching-element control signal.

17. The switching control circuit according to claim 14, wherein the second operation parameter is a switching frequency of the switching element.

18. The switching control circuit according to claim 14, wherein the second operation parameter is a threshold to determine an overload state based on an overcurrent detection signal resulting from current flowing in the power conversion circuit through an operation of the switching control circuit.

19. The switching control circuit according to claim 14, wherein the second operation parameter is a threshold to determine an overvoltage state based on an overvoltage detection signal indicating whether or not a voltage output from the power conversion circuit is an overvoltage.

20. The switching control circuit according to claim 14, wherein the second operation parameter is a start threshold to determine starting of the power conversion circuit or a stop threshold to determine stopping of the power conversion circuit.

21. A switching control circuit including a semiconductor integrated circuit arranged to define a power conversion circuit in a switching power-supply apparatus to control a switching element, the semiconductor integrated circuit including external terminals including a power-supply terminal to which a power-supply voltage is applied from outside of the semiconductor integrated circuit to inside of the semiconductor integrated circuit, an input terminal arranged to input a voltage signal from the outside to the inside, and an output terminal arranged to output a voltage signal from the inside to the outside, at least one of the external terminals defining a multifunctional external terminal, the switching control circuit comprising:

a first operation-state setter arranged to set a first operation parameter or first operation mode information of the power conversion circuit or first control of the switching element, based on a signal of the multifunctional external terminal; and a second operation-state setter arranged to detect, as a determination signal, a voltage induced in an external circuit that is connected outside of the multifunctional external terminal and that includes at least a resistance element or a semiconductor element and to set a second operation parameter or second operation mode information of the power conversion circuit in accordance with the determination signal; wherein in accordance with a result of a comparison between a waveform peak value and a reference voltage, the first operation-state setter is arranged to set the first operation parameter or the first operation mode information or the first control of the switching element; and in accordance with a result of a comparison between an average voltage value of the determination signal and a reference voltage, the second operation-state setter is arranged to set the second operation parameter or the second operation mode information or second control of the switching element.

22. The switching control circuit according to claim 21, wherein the second operation mode information is information regarding a distinction of an output control system of the power conversion circuit.

23. The switching control circuit according to claim 21, wherein the second operation mode information is information regarding a distinction of an operation mode in an overvoltage state.

24. The switching control circuit according to claim 21, wherein the second operation mode information is information regarding a distinction of an operation mode in a light load state.

25. The switching control circuit according to claim 22, wherein the output control system is one of output-voltage constant control, output-current constant control, and output-power constant control.

26. The switching control circuit according to claim 23, wherein the operation mode in the overvoltage state is an automatic return mode in which an oscillation period and a stop period are repeated or a latch mode in which oscillation is stopped.

27. The switching control circuit according to claim 24, wherein the operation mode in the light load state is an intermittent oscillation mode in which an oscillation period and a stop period are repeated or a frequency reduction mode in which a switching frequency of the switching element is reduced to perform an operation in a discontinuous current mode.

28. A switching control circuit including a semiconductor integrated circuit arranged to define a power conversion circuit in a switching power-supply apparatus to control a switching element, the semiconductor integrated circuit including external terminals including a power-supply terminal to which a power-supply voltage is applied from outside of the semiconductor integrated circuit to inside of the semiconductor integrated circuit, an input terminal arranged to input a voltage signal from the outside to the inside, and an output terminal arranged to output a voltage signal from the inside to the outside, at least one of the external terminals defining a multifunctional external terminal, the switching control circuit comprising:

a first operation-state setter arranged to set a first operation parameter or first operation mode information of the power conversion circuit or first control of the switching element, based on a signal of the multifunctional external terminal; and a second operation-state setter arranged to detect, as a determination signal, a voltage induced in an external circuit that is connected outside of the multifunctional external terminal and that includes at least a resistance element or a semiconductor element and to set a second operation parameter or second operation mode information of the power conversion circuit in accordance with the determination signal; wherein in accordance with a result of a comparison between a largest voltage value and a reference voltage, the first operation-state setter is arranged to set the first operation parameter or the first operation mode information or the first control of the switching element; and in accordance with a result of a comparison between a smallest voltage value of the determination signal and a reference voltage, the second operation-state setter is arranged to set the second operation parameter or the second operation mode information or second control of the switching element.

29. The switching control circuit according to claim 28, wherein one of signals input to the multifunctional external terminal is a frequency setting signal that specifies a frequency of a voltage pulse, output from the output terminal, to operate of the switching control circuit;

in accordance with the frequency setting signal, the first operation-state setter is arranged to specify a frequency of a voltage pulse output from the multifunctional external terminal; and in accordance with the determination signal, the second operation-state setter is arranged to set the second operation parameter or the second operation mode information or second control of the switching element, other than an operation of specifying the frequency.

30. A switching control circuit including a semiconductor integrated circuit arranged to define a power conversion circuit in a switching power-supply apparatus to control a switching element, the semiconductor integrated circuit including external terminals including a power-supply terminal to which a power-supply voltage is applied from outside of the semiconductor integrated circuit to inside of the semiconductor integrated circuit, an input terminal arranged to input a voltage signal from the outside to the inside, and an output terminal arranged to output a voltage signal from the inside to the outside, at least one of the external terminals defining a multifunctional external terminal, the switching control circuit comprising:

a first operation-state setter arranged to set a first operation parameter or first operation mode information of the power conversion circuit or first control of the switching element, based on a signal of the multifunctional external terminal; and a second operation-state setter arranged to detect, as a determination signal, a voltage induced in an external circuit that is connected outside of the multifunctional external terminal and that includes at least a resistance element or a semiconductor element and to set a second operation parameter or second operation mode information of the power conversion circuit in accordance with the determination signal; wherein in accordance with a frequency band of the determination signal, the second operation-state setter is arranged to set the second operation parameter or the second operation mode information or second control of the switching element.

31. The switching control circuit according to claim 30, wherein the second operation mode information is information regarding a distinction of an operation mode in an overload state.

32. The switching control circuit according to claim 31, wherein the operation mode in the overload state is an automatic return mode in which an oscillation period and a stop period are repeated or a latch mode in which oscillation is stopped.

33. A switching control circuit including a semiconductor integrated circuit arranged to define a power conversion circuit in a switching power-supply apparatus to control a switching element, the semiconductor integrated circuit including external terminals including a power-supply terminal to which a power-supply voltage is applied from outside of the semiconductor integrated circuit to inside of the semiconductor integrated circuit, an input terminal arranged to input a voltage signal from the outside to the inside, and an output terminal arranged to output a voltage signal from the inside to the outside, at least one of the external terminals defining a multifunctional external terminal, the switching control circuit comprising:

a first operation-state setter arranged to set a first operation parameter or first operation mode information of the power conversion circuit or first control of the switching element, based on a signal of the multifunctional external terminal; and a second operation-state setter arranged to detect, as a determination signal, a voltage induced in an external circuit that is connected outside of the multifunctional external terminal and that includes at least a resistance element or a semiconductor element and to set a second operation parameter or second operation mode information of the power conversion circuit in accordance with the determination signal; wherein in accordance with the determination signal before an operation of the power conversion circuit is started, the second operation-state setter is arranged to set the second operation parameter or the second operation mode information or second control of the switching element.

34. The switching control circuit according to claim 33, wherein a signal output from the multifunctional external terminal is a reference voltage signal generated in order to operate the switching control circuit;

the first operation-state setter is arranged to output the reference voltage signal; and in accordance with the determination signal, the second operation-state setter is arranged to set the second operation parameter or the second operation mode information or second control of the switching element, other than the outputting of the reference voltage signal.

35. A switching control circuit including a semiconductor integrated circuit arranged to define a power conversion circuit in a switching power-supply apparatus to control a switching element, the semiconductor integrated circuit including external terminals including a power-supply terminal to which a power-supply voltage is applied from outside of the semiconductor integrated circuit to inside of the semiconductor integrated circuit, an input terminal arranged to input a voltage signal from the outside to the inside, and an output terminal arranged to output a voltage signal from the inside to the outside, at least one of the external terminals defining a multifunctional external terminal, the switching control circuit comprising:
- a first operation-state setter arranged to set a first operation parameter or first operation mode information of the power conversion circuit or first control of the switching element, based on a signal of the multifunctional external terminal; and
- a second operation-state setter arranged to detect, as a determination signal, a voltage induced in an external circuit that is connected outside of the multifunctional external terminal and that includes at least a resistance element or a semiconductor element and to set a second operation parameter or second operation mode information of the power conversion circuit in accordance with the determination signal; wherein
- in accordance with a signal of the multifunctional external terminal in a startup time from starting of an operation of the power conversion circuit until a steady-state operation, the first operation-state setter is arranged to set the first operation parameter or the first operation mode information or the first control of the switching element; and
- in accordance with the determination signal of the steady-state operation of the power conversion circuit, the second operation-state setter is arranged to set the second operation parameter or the second operation mode information or second control of the switching element.

36. The switching control circuit according to claim 35, wherein
- one of signals input to the multifunctional external terminal is a pulse-width setting signal to specify a pulse width of a voltage pulse, output from the output terminal, to operate of the switching control circuit;
- in accordance with the pulse-width setting signal, the first operation-state setter is arranged to specify a pulse width of a voltage pulse output from the multifunctional external terminal; and
- in accordance with the determination signal, the second operation-state setter is arranged to set the second operation parameter or the second operation mode information or second control of the switching element, other than an operation of specifying the pulse-width.

37. The switching control circuit according to claim 35, wherein the second operation parameter is a limit value of a largest value or a smallest value of a switching frequency of the switching element.

38. The switching control circuit according to claim 35, wherein the second operation parameter is a limit value of an on time of the switching element.

39. The switching control circuit according to claim 35, wherein the second operation parameter is a limit value of a duty ratio of a pulse to drive the switching element.

40. A switching control circuit including a semiconductor integrated circuit arranged to define a power conversion circuit in a switching power-supply apparatus to control a switching element, the semiconductor integrated circuit including external terminals including a power-supply terminal to which a power-supply voltage is applied from outside of the semiconductor integrated circuit to inside of the semiconductor integrated circuit, an input terminal arranged to input a voltage signal from the outside to the inside, and an output terminal arranged to output a voltage signal from the inside to the outside, at least one of the external terminals defining a multifunctional external terminal, the switching control circuit comprising:
- a first operation-state setter arranged to set a first operation parameter or first operation mode information of the power conversion circuit or first control of the switching element, based on a signal of the multifunctional external terminal; and
- a second operation-state setter arranged to detect, as a determination signal, a voltage induced in an external circuit that is connected outside of the multifunctional external terminal and that includes at least a resistance element or a semiconductor element and to set a second operation parameter or second operation mode information of the power conversion circuit in accordance with the determination signal; wherein
- in accordance with the determination signal, of an on-period or off-period of the switching element, in a period that is not necessary for operation of the power conversion circuit, the second operation-state setter is arranged to set the second operation parameter or the second operation mode information or second control of the switching element.

41. The switching control circuit according to claim 40, wherein
- one of signals input to the multifunctional external terminal is a polarity reversal timing signal indicating that a polarity of current flowing in or a voltage generated by an inductor or a transformer of the power conversion circuit changes through an operation of the switching control circuit;
- the first operation-state setter is arranged to control the switching control circuit in accordance with the polarity reversal signal; and
- in accordance with the determination signal, the second operation-state setter is arranged to set the second operation parameter or the second operation mode information or second control of the switching element, other than the controlling of the switching control circuit in accordance with the polarity reversal timing signal.

* * * * *